(12) United States Patent
Beattie, Jr. et al.

(10) Patent No.: US 9,992,621 B2
(45) Date of Patent: Jun. 5, 2018

(54) METHODS AND APPARATUS FOR IDENTIFYING COMMUNICATION SERVICE AVAILABILITY FOR A MOBILE DEVICE USING BREADCRUMBS

(71) Applicant: AT&T Intellectual Property I, LP, Atlanta, GA (US)

(72) Inventors: James Gordon Beattie, Jr., Bergenfield, NJ (US); Stephen Francis Triano, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 242 days.

(21) Appl. No.: 14/858,156

(22) Filed: Sep. 18, 2015

(65) Prior Publication Data

US 2017/0086022 A1 Mar. 23, 2017

(51) Int. Cl.
*H04W 4/02* (2018.01)
*H04W 64/00* (2009.01)

(52) U.S. Cl.
CPC ........... *H04W 4/023* (2013.01); *H04W 64/00* (2013.01)

(58) Field of Classification Search
CPC ..... H04W 4/023; H04W 4/025; H04W 64/00; G01S 5/06
See application file for complete search history.

(56) References Cited

U.S. PATENT DOCUMENTS

| | | | |
|---|---|---|---|
| 6,321,158 B1 * | 11/2001 | DeLorme | G01C 21/26 340/995.16 |
| 6,798,377 B1 * | 9/2004 | Lupash | G01S 19/20 342/357.29 |
| 7,256,711 B2 | 8/2007 | Sheha et al. | |
| 7,502,382 B1 * | 3/2009 | Liu | H04B 7/18521 370/225 |
| 8,390,480 B2 | 3/2013 | Sheha et al. | |
| 8,712,686 B2 | 4/2014 | Bandyopadhyay et al. | |
| 9,074,901 B1 | 7/2015 | Subramanian et al. | |

(Continued)

OTHER PUBLICATIONS

Leland Roys, "BootPrint—Pocket Survival", 2014, [https://itunes.apple.com/us/app/bootprint-pocket-survival/id377263840?mt=8], retrieved on Jul. 16, 2015, (3 pages).

(Continued)

*Primary Examiner* — Charles Appiah
*Assistant Examiner* — Edward Zhang
(74) *Attorney, Agent, or Firm* — Hanley, Flight & Zimmerman, LLC

(57) ABSTRACT

Methods and apparatus are disclosed for enabling a mobile device to generate pathway records, and to use the generated records to identify a location at which a desired type of communication service is available for the mobile device. The generated pathway records include (a) timing data indicative of a data collection time, (b) location data indicative of a collection location of the mobile device at the collection time, and (c) data indicative of available communication services for the mobile device at the collection location. Via a user interface, the mobile device presents a map including indications of (a) a current location of the mobile device, (b) a trail representing a time-ordered sequence of the pathway records, and (c) the available communication services associated with respective ones of the pathway records generated by the mobile device.

18 Claims, 11 Drawing Sheets

(56) References Cited

U.S. PATENT DOCUMENTS

| | | | |
|---|---|---|---|
| 2005/0064844 A1 | 3/2005 | McAvoy et al. | |
| 2005/0075116 A1* | 4/2005 | Laird | A61B 5/04 455/456.3 |
| 2010/0040016 A1* | 2/2010 | Lor | H04W 12/06 370/331 |
| 2010/0241623 A1 | 9/2010 | Acker et al. | |
| 2010/0318293 A1 | 12/2010 | Brush et al. | |
| 2011/0207471 A1 | 8/2011 | Murray et al. | |
| 2012/0136529 A1 | 5/2012 | Curtis et al. | |
| 2014/0253377 A1* | 9/2014 | Scalisi | G01S 19/34 342/357.74 |
| 2014/0335897 A1 | 11/2014 | Clem et al. | |

OTHER PUBLICATIONS

ITunes, "BootPrint—Pocket Survival," 2010, [http://www.caffeinatedconsulting.com/pocket_survival], retrieved on Jul. 16, 2015, (3 pages).

Opensignal, Inc, "OpenSignal—Signal Finder and 3G/4G/Wifi Coverage Maps", 2014, [https://itunes.apple.com/us/app/opensignal-signal-finder-3g/id598298030?mt=8], retrieved on Jul. 16, 2015, (3 pages).

Paul Sawers, "OpenSignal finally launches its crowdsourced cellular coverage app for iPhone", [http://thenextweb.com/apps/2013/04/18/opensignal-finally-launches-its-crowdsourced-cell . . . ], Apr. 18, 2013, retrieved on Jul. 15, 2015, (7 pages).

Opensignal, Inc, "Take Control of your Signal", 2015, [http://opensignal.com/android/], retrieved on Jul. 16, 2015, (3 pages).

Opensignal,Inc, "OpenSignal: The Complete Connection Toolkit", 2015, [http://opensignal.com/iphone/], retrieved on Jul. 16, 2015, (3 pages).

Rootmetrics, "Cell Phone Coverage Map", 2014, [https://itunes.apple.com/us/app/cell-phone-coverage-map/id399701910?mt=8&ign-mpt=uo . . . ], retrieved on Jul. 16, 2015, (3 pages).

Sensorly, "Sensorly-Speedtests & 4G/LTE, CDMA, GSM, Wifi coverage & speed maps", 2014, [https://itunes.apple.com/us/app/sensorly-speedtests-4g-lte/id544269103?mt=8], retrieved on Jul. 16, 2015, (3 pages).

Sensorly, "Unbiased Wireless Network Information. From people just like you.", 2013 [http://www.sensorly.com/], retrieved on Jul. 15, 2015, (5 pages).

Faggiani et al, "Smartphone-based crowdsourcing for network monitoring: Opportunities, challenges, and a case study." IEEE Communications Magazine 52.1 (2014): 106-113, ( 8 pages).

* cited by examiner

| | GENERATED BREADCRUMBS | | | | | | | |
|---|---|---|---|---|---|---|---|---|
| | TIMING DATA 320 | LOCATION DATA 322 | | | CONNECTIVITY DATA 324 | | | |
| BREADCRUMB IDENTIFIER 318 | TIME 326 | LAT 328 | LONG 330 | ALT 332 | NETWORK TYPE 334 | SIGNAL STRENGTH 336 | AVAILABLE SERVICE TYPE 338 |
| 0001 | 09:10:00 | 41.3148 | -76.3011 | 655m | LTE | -65dBm | TM, VC, NB, MS |
| 0002 | 09:20:00 | 41.3180 | -76.2998 | 650m | LTE | -105dBm | TM, VC, NB |
| 0003 | 09:30:00 | 41.3215 | -76.2985 | 650m | NONE | NONE | NONE |
| 0004 | 09:40:00 | 41.3249 | -76.2968 | 655m | W-CDMA | -90dBm | TM, VC, NB |
| 0005 | 09:50:00 | 41.3251 | -76.2900 | 655m | NONE | NONE | NONE |
| 0006 | 10:00:00 | 41.3296 | -76.2873 | 660m | GSM | -90dBm | TM, VC |
| 0007 | 10:10:00 | 41.3326 | -76.2903 | 660m | NONE | NONE | NONE |
| 0008 | 10:20:00 | 41.3308 | -76.2985 | 665m | NONE | NONE | NONE |

TM = TEXT MESSAGING
VC = VOICE CALLING
NB = NETWORK BROWSING
MS = MEDIA STREAMING

FIG. 3

METHODS AND APPARATUS FOR IDENTIFYING COMMUNICATION SERVICE AVAILABILITY FOR A MOBILE DEVICE USING BREADCRUMBS

FIELD OF THE DISCLOSURE

This disclosure relates generally to the collection and use of breadcrumbs by a mobile device, and, more particularly, to methods and apparatus for using breadcrumbs to identify a location at which a desired type of communication service is available for the mobile device.

BACKGROUND

Mobile devices such as tablets and smartphones are commonly equipped with a Global Positioning System (GPS) receiver that enables the mobile device to determine its location at a given time. Such mobile devices are also commonly equipped with a radio receiver and radio transmitter that may enable the mobile device to communicate with a cellular base station or a wireless access point. When the mobile device is within a coverage area of a cellular base station and/or a wireless access point, cellular and/or Wi-Fi® connectivity may respectively be available to the mobile device. When the mobile device is not within a coverage area of a cellular base station or a wireless access point, cellular and/or Wi-Fi® connectivity will respectively be unavailable to the mobile device.

When cellular and/or Wi-Fi® connectivity exists between a mobile device and a cellular base station and/or a wireless access point, the type(s) of communication service(s) (e.g., text messaging, voice calling, network browsing or streaming media content) that may be available to the mobile device may depend upon the network capabilities of the base station and/or the wireless access point, and may also depend upon the strength and/or bandwidth of the signal(s) that may be communicated between the mobile device and the cellular base station and/or the wireless access point.

BRIEF DESCRIPTION OF THE DRAWINGS

FIG. 3 is an example data structure containing example pathway records generated by the example breadcrumb generator of FIG. 2 based on data collected by the example mobile device of FIGS. 1-2 in the example data collection environment of FIG. 1.

The figures are not to scale. Wherever possible, the same reference numbers will be used throughout the drawing(s) and accompanying written description to refer to the same or like parts.

DETAILED DESCRIPTION

Figure 1:
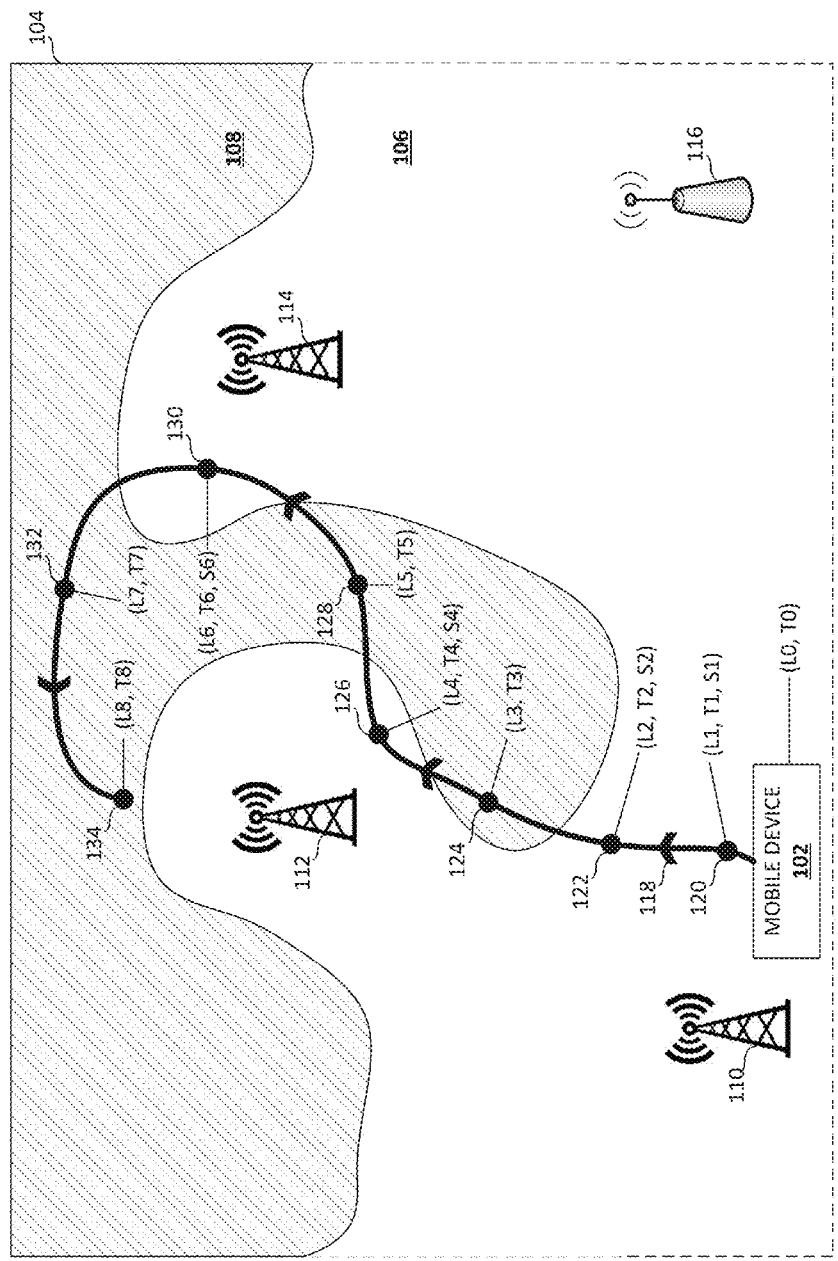
FIG. 1 is an example data collection environment including an example mobile device constructed in accordance with the teachings of this disclosure to identify a location at which a desired type of communication service is available for the mobile device.

While traveling, an end user of a mobile device sometimes finds him- or herself in a location where there is little or no cellular and/or Wi-Fi® connectivity for the mobile device. In such instances, the end user may be at a loss for where he or she can relocate to in order to obtain connectivity for the mobile device. The end user may also find him- or herself with a need for bandwidth for the mobile device that is commensurate with a particular type of communication service desired by the end user such as, for example, text messaging, voice calling, network browsing or streaming media content. The end user's inability to identify a location of connectivity to support the desired type of communication service may in some instances place the user in danger (e.g., if the user is unable to obtain help or warn of an impending threat).

Examples disclosed herein enable a mobile device to generate breadcrumbs, and to use the generated breadcrumbs to identify a location at which a desired type of communication service is available for the mobile device. As used herein, the term "breadcrumb" refers to a computer-readable data point and/or data record including information associated with the location (e.g., a latitude, a longitude, an altitude, one or more communication service type(s) that may be available at the location, one or more network parameter(s) and/or signal parameter(s) associated with one or more cellular and/or Wi-Fi® signal(s) received at the location, etc.) of an apparatus and/or device at a given time. The term "pathway record(s)" is used interchangeably herein with the term "breadcrumb(s)." As used herein, the terms "communication service(s)" and/or "communication service type(s)" refer to a type and/or form of cellular and/or Wi-Fi® communication service that may be accessible to a mobile device via a cellular base station and/or a wireless access point such as, for example, text messaging, voice calling, network browsing, streaming media content, etc.

In some disclosed examples, the mobile device generates pathway records based on data collected by the mobile device at a collection frequency. In some disclosed examples, the pathway records include timing data indicative of a collection time. In some disclosed examples, the pathway records include location data indicative of a collection location of the mobile device at the collection time. In some disclosed examples, the pathway records include data indicative of available communication services for the mobile device at the collection location. In some disclosed examples, respective ones of the available communication services are determined based on a signal parameter and a network parameter associated with one or more signals received by the mobile device at the collection location. In some disclosed examples, the available communication services include at least one of a text messaging service, a voice calling service, a network browsing service, or a streaming media service.

In some disclosed examples, the mobile device presents a map via a user interface of the mobile device. In some disclosed examples, the map includes an indication of a current location of the mobile device. In some disclosed examples, the map includes an indication of a trail representing a time-ordered sequence of the pathway records based on the timing data associated with respective ones of the pathway records generated by the mobile device. In some disclosed examples, the map includes an indication of the available communication services associated with respective ones of the pathway records generated by the mobile device.

In some disclosed examples, the mobile device receives a notification via the user interface of the mobile device indicative of a desired communication service for the mobile device. In some disclosed examples, in response to the notification, the mobile device provides an indication of an estimated relocation distance associated with relocating the mobile device from the current location to the collection location associated with one of the respective pathway records having an available communication service that supports the desired communication service. In some disclosed examples, in response to the notification, the mobile device provides an indication of an estimated relocation time associated with relocating the mobile device from the current location to the collection location associated with one of the respective pathway records having an available communication service that supports the desired communication service. In some disclosed examples, the estimated relocation distance and/or the estimated relocation time is further associated with relocating the mobile device along a pathway corresponding to the trail. In some disclosed examples, the desired communication service is at least one of a text messaging service, a voice calling service, a network browsing service, or a streaming media service.

In some disclosed examples, the collection frequency at which the mobile device collects data for the generation of pathway records is based on a threshold change in time for the mobile device relative to the collection time of a most-recently generated one of the pathway records. In some disclosed examples, the collection frequency at which the mobile device collects data for the generation of pathway records is based on a threshold change in location for the mobile device relative to the collection location of a most-recently generated one of the pathway records. In some disclosed examples, the collection frequency is configurable via the user interface of the mobile device. In some disclosed examples, the collection frequency may be configured to decrease in response to a decrease in a remaining battery life parameter of the mobile device. In some disclosed examples, the collection frequency may be configured to decrease in response to a decrease in a remaining storage capacity parameter of the mobile device.

In some disclosed examples, the mobile device may be configured to power off at least one of a GPS receiver, a radio receiver, or a radio transmitter of the mobile device during a period of time at which data is not being collected for the generation of pathway records.

In some disclosed examples, the mobile device may be configured to upload the pathway records generated by the mobile device to a server for inclusion in a pathway record database. In some disclosed examples, the pathway record database includes crowd-sourced pathway records.

FIG. 1 is an example data collection environment including an example mobile device 102 constructed in accordance with the teachings of this disclosure to identify a location at which a desired type of communication service is available for the mobile device 102. In the illustrated example, the mobile device 102 is maneuverable and/or transportable within an example geographic area 104. The example mobile device 102 may be implemented using, for example, a laptop computer, a tablet, a smartphone, or any other type of mobile computing device. In some examples, the mobile device may be a subcomponent to another device. In some examples, the mobile device 102 may be connected to and/or integrated within a motorized vehicle (e.g., a car) that can be driven and/or maneuvered within the example geographic area 104.

In the illustrated example of FIG. 1, the geographic area 104 includes an example service area 106 and an example non-service area 108. While the example mobile device 102 may be able to acquire, receive, access and/or utilize one or more form(s) of cellular and/or Wi-Fi® connectivity within the example service area 106 capable of supporting one or more type(s) of communication services (e.g., text messaging, voice calling, network browsing, streaming media, etc.), the mobile device 102 is generally unable to acquire, receive, access and/or utilize any of such form(s) of cellular and/or Wi-Fi® connectivity and/or type(s) of communication services within the example non-service area 108.

In the illustrated example of FIG. 1, the geographic area 104 is a rural area within which cellular and/or Wi-Fi® connectivity and/or communication services available to the mobile device 102 may be sparse in comparison to cellular and/or Wi-Fi® connectivity and/or communication services that may be available to the mobile device 102 within, for example, a densely populated urban area. The example geographic area 104 may be of any size, shape and/or configuration. For example, the geographic area 104 may correspond to some portion (including the entirety) of a hiking and/or wilderness territory, a region, a town, a zip code, etc. The example service area 106 and the example non-service area 108 may likewise be of any size, shape and/or configuration. Moreover, one or more additional service area(s) and/or non-service area(s) may exist within the example geographic area 104. The number, size, location and/or configuration of the service area(s) and/or non-service area(s) may be dependent on the ability of the mobile device 102 to communicate with a particular cellular service provider (e.g., AT&T®, Verizon®, T-Mobile®, Sprint®, etc.). The number, size, location and/or configuration of the service area(s) and/or non-service area(s) may also be dependent on the coverage area(s) associated with a particular cellular service provider's cellular network, and/or the coverage area(s) associated with one or more wireless access points that provide accessible Wi-Fi® connectivity.

In the illustrated example of FIG. 1, the mobile device 102 is able to identify its location within the example geographic area 104 based on one or more signal(s) collected, acquired and/or received by the mobile device 102 from one or more example Global Positioning System (GPS) satellite(s) (not shown). For example, the signal(s) received by the mobile device 102 from the GPS satellite(s) may contain information from which the current latitude, longitude and/or altitude of the mobile device 102 can be identified and/or derived. The signal(s) received by the mobile device 102 from the GPS satellite(s) may also contain information from which the current time can be identified and/or derived. In the illustrated example of FIG. 1, the mobile device 102 may be able to collect, acquire and/or receive one or more signal(s) from the GPS satellite(s) even when the mobile device 102 is located within the example non-service area 108 of the geographic area 104.

In the illustrated example of FIG. 1, the mobile device 102 is able to determine one or more type(s) of communication services that may be available to the mobile device 102 at a specific location within the example service area 106 of the geographic area 104 based on one or more signal(s) collected, acquired and/or received by the mobile device 102 from one or more example cellular base station(s) 110, 112, 114 and/or one or more example wireless access point(s) 116. For example, the signal(s) received by the mobile device 102 from the example cellular base stations 110, 112, 114 and/or from the example wireless access point 116 may contain information from which the strength of the signal and/or the type of network over which the signal is being transmitted and received may be identified and/or derived.

The signal(s) received by the mobile device 102 from the cellular base stations 110, 112, 114 and/or from the wireless access point 116 may also contain information from which the time of the transmission and/or receipt of the signal can be identified and/or derived. In some examples, the signal(s) received by the mobile device 102 from the cellular base stations 110, 112, 114 may also contain information that may assist with identifying and/or deriving the current location of the mobile device 102 within the example geographic area 104. The example service area 106 and/or, more generally, the example geographic area 104 may include any number of cellular base stations and/or wireless access points.

In the illustrated example of FIG. 1, the mobile device 102 may be able to collect, acquire and/or receive signals from the cellular base stations 110, 112, 114 and/or from the wireless access point 116 when the mobile device 102 is located within the example service area 106 of the geographic area 104. The mobile device 102 is generally unable, however, to collect, acquire and/or receive any signals from the cellular base stations 110, 112, 114 and/or from the wireless access point 116 when the mobile device 102 is located within the example non-service area 108 of the geographic area 104.

In the illustrated example of FIG. 1, the example cellular base stations 110, 112, 114 and/or the example wireless access point 116 may be associated with different types of cellular and/or W-Fi networks and/or protocols capable of supporting one or more type(s) of communication services. For example, the first cellular base station 110 may be associated with an example 4G LTE network that is capable of supporting communication services including text messaging, voice calling, network browsing, and streaming media. The second cellular base station 112 may be associated with an example 3G W-CDMA network that is capable of supporting communication services including text messaging, voice calling and network browsing, but not streaming media. The third cellular base station 114 may be associated with an example 2G GSM network that is capable of supporting communication services including text messaging and voice calling, but not network browsing or streaming media. The wireless access point 116 may be associated with the 802.11n Wi-Fi® protocol, and may be capable of supporting communication services including text messaging, voice calling, network browsing and streaming media.

In some examples, the type(s) of communication service(s) that the example cellular base stations 110, 112, 114 and/or the example wireless access point 116 is/are able to provide to the mobile device 102 depends not only on the type of network and/or protocol with which the cellular base stations 110, 112, 114 and/or the wireless access point 116 are respectively associated, but also upon the respective strength of the signals communicated between the mobile device 102 and the cellular base stations 110, 112, 114 and/or the wireless access point 116. For example, if the strength of the signals communicated between the mobile device 102 and the example first cellular base station 110 is minimal, the mobile device 102 may be unable to utilize the full range of communication services that the first cellular base station 110 might otherwise make available to the mobile device 102 under improved and/or optimal signal strength conditions.

In the illustrated example of FIG. 1, the mobile device 102 may collect, acquire and/or receive signals from the example GPS satellite(s), the example cellular base station(s) 110, 112 114, and/or the example wireless access point 116 as the mobile device 102 travels within the geographic area 104 along an example path 118. In the illustrated example, prior to collecting signal data from within the geographic area 104, the mobile device 102 is unaware of the respective boundaries of the example service area 106 and/or the non-service area 108, and is further unaware of the range and/or type(s) of communication services that may be available to the mobile device 102 at any given location within the geographic area 104. As described below in connection with FIGS. 2 and 3, the example mobile device 102 generates breadcrumbs and/or pathway records based on the signals that the mobile device 102 collects, acquires and/or receives from the example GPS satellite(s), the example cell towers 110, 112, 114, and/or the example Wi-Fi® access point 116 while traveling within the example geographic area 104.

In the illustrated example of FIG. 1, the mobile device 102 receives one or more initiating signal(s) from the example GPS satellite(s). The initiating signal(s) may be received by the mobile device 102 upon the mobile device 102 being powered on and/or upon an application of the mobile device 102 being instructed to commence the collection of data for the purpose of generating breadcrumbs and/or pathway records. The initiating signal(s) include location data and timing data from which a reference location "L0" of the mobile device 102 at a reference time "T0" can be identified and/or derived. In the illustrated example, the reference location "L0" corresponds to the starting and/or initiating point of the example path 118.

As described below in connection with FIG. 2, the reference location may serve as a baseline data point against which the mobile device 102 may determine and/or measure changes in the location of the mobile device 102 within the geographic area 104. Similarly, the reference time "T0" may serve as a baseline data point against which the mobile device 102 may determine and/or measure the progression of time.

At an example first location 120 along the path 118, the mobile device 102 receives one or more signal(s) from the example GPS satellite(s) including location data and timing data from which a location "L1" of the mobile device 102 at a time "T1" can be identified and/or derived. In the illustrated example, the first location 120 is within the example service area 106 of the geographic area 104. At the example first location 120, the mobile device 102 also receives one or more signal(s) from the example first cellular base station 110 including connectivity data from which the availability of one or more type(s) of communication services "S1" can be identified and/or derived. The connectivity data may include data indicative of the strength of the cellular signal and/or the type of cellular network over which the cellular signal is being transmitted and received. In the illustrated example, the first cellular base station 110 is associated with a 4G LTE network that is capable of supporting communication services including text messaging, voice calling, network browsing, and streaming media.

At an example second location 122 along the path 118, the mobile device 102 receives one or more signal(s) from the example GPS satellite(s) including location data and timing data from which a location "L2" of the mobile device 102 at a time "T2" can be identified and/or derived. In the illustrated example, the second location 122 is within the example service area 106 of the geographic area 104. At the example second location 122, the mobile device 102 receives one or more signal(s) from the example first cellular base station 110 including connectivity data from which the availability of one or more type(s) of communication services "S2" can be identified and/or derived. The connectivity data may include data indicative of the strength of the cellular signal and/or the type of cellular network over which the cellular signal is being transmitted and received.

In the illustrated example, the second location 122 is more proximate to the example non-service area 108 in comparison to the proximity of the first location 120 thereto. Thus, the strength of the signal(s) received by the mobile device 102 from the first cellular base station 110 at the second location 122 may be less than the strength of the signal(s) received by the mobile device 102 from the first cellular base station 110 at the first location 120. As a result, the range of communication services that may be available to the mobile device 102 via the first cellular base station 110 at the second location 122 may be narrower, fewer and/or less than the range of communication services that may be available to the mobile device 102 via the first cellular base station 110 at the first location 120. For example, while the first cellular base station 110 may be able to provide communication services including text messaging, voice calling, network browsing, and streaming media to the mobile device 102 when the mobile device 102 is located at the first location 120, the first cellular base station 110 may only be able to provide communication services including text messaging, voice calling and network browsing to the mobile device 102 when the mobile device 102 is located at the second location 122.

At an example third location 124 along the path 118, the mobile device 102 receives one or more signal(s) from the example GPS satellite(s) including location data and timing data from which a location "L3" of the mobile device 102 at a time "T3" can be identified and/or derived. In the illustrated example, the third location 124 is within the example non-service area 108 of the geographic area 104. Within the non-service area 108, the mobile device 102 is unable to receive any signal(s) from any cellular base station (e.g., the cellular base stations 110, 112, 114) and/or any wireless access point (e.g., the wireless access point 116) located within the geographic area 104. As a result, the mobile device 102 assigns, attributes and/or associates a designation to and/or with the third location 124 indicating that no cellular and/or Wi-Fi® connectivity, and/or no communication service(s), are available to the mobile device 102 at the third location 124. In some examples, an available communication services parameter "S3" associated with the example third location 124 may indicate that no communication services are available to the mobile device 102 at the third location 124.

At an example fourth location 126 along the path 118, the mobile device 102 receives one or more signal(s) from the example GPS satellite(s) including location data and timing data from which a location "L4" of the mobile device 102 at a time "T4" can be identified and/or derived. In the illustrated example, the fourth location 126 is within the example service area 106 of the geographic area 104. At the example fourth location 126, the mobile device 102 also receives one or more signal(s) from the example second cellular base station 112 including connectivity data from which the availability of one or more type(s) of communication services "S4" can be identified and/or derived. The connectivity data may include data indicative of the strength of the signal and/or the type of network over which the signal is being transmitted and received. In the illustrated example, the second cellular base station 112 is associated with a 3G W-CDMA network that is capable of supporting communication services including text messaging, voice calling and network browsing, but not streaming media. As a result, the maximum range of communication services that may be available to the mobile device 102 via the second cellular base station 112 is narrower, fewer and/or less than the maximum range of communication services that may be available to the mobile device 102 via the first cellular base station 110.

At an example fifth location 128 along the path 118, the mobile device 102 receives one or more signal(s) from the example GPS satellite(s) including location data and timing data from which a location "L5" of the mobile device 102 at a time "T5" can be identified and/or derived. In the illustrated example, the fifth location 128 is within the example non-service area 108 of the geographic area 104. The mobile device 102 accordingly assigns, attributes and/or associates a designation to and/or with the fifth location 128 indicating that no cellular and/or Wi-Fi® connectivity, and/or no communication service(s), are available to the mobile device 102 at the fifth location 128. In some examples, an available communication services parameter "S5" associated with the example fifth location 128 may indicate that no communication services are available to the mobile device 102 at the fifth location 128.

At an example sixth location 130 along the path 118, the mobile device 102 receives one or more signal(s) from the example GPS satellite(s) including location data and timing data from which a location "L6" of the mobile device 102 at a time "T6" can be identified and/or derived. In the illustrated example, the sixth location 130 is within the example service area 106 of the geographic area 104. At the example sixth location 130, the mobile device 102 also receives one or more signal(s) from the example third cellular base station 114 including connectivity data from which the availability of one or more type(s) of communication services "S6" can be identified and/or derived. The connectivity data may include data indicative of the strength of the signal and/or the type of network over which the signal is being transmitted and received. In the illustrated example, the third cellular base station 114 is associated with a 2G GSM network that is capable of supporting communication services including text messaging and voice calling, but not network browsing or streaming media. As a result, the maximum range of communication services that may be available to the mobile device 102 from the third cellular base station 114 is narrower, fewer and/or less than the maximum range of communication services that may be available to the mobile device 102 from either of the first cellular base station 110 or the second cellular base station 112.

At an example seventh location 132 along the path 118, the mobile device 102 receives one or more signal(s) from the example GPS satellite(s) including location data and timing data from which a location "L7" of the mobile device 102 at a time "T7" can be identified and/or derived. At an example eighth location 134 along the path 118, the mobile device 102 receives one or more signal(s) from the example GPS satellite(s) including location data and timing data from which a location "L8" of the mobile device 102 at a time "T8" can be identified and/or derived. In the illustrated example, both the seventh location 132 and the eighth location 134 are within the example non-service area 108 of the geographic area 104. The mobile device 102 accordingly assigns, attributes and/or associates a designation to and/or with each of the seventh location 132 and the eighth location 134 indicating that no cellular and/or Wi-Fi® connectivity, and/or no communication service(s), are available to the mobile device 102 at either the seventh location 132 or the eighth location 134. In some examples, an available communication services parameter "S7" associated with the example seventh location 132, and an available communication services parameter "S8" associated with the example eighth location 134 may respectively indicate that no communication services are available to the mobile device 102 at the seventh location 132 or the eighth location 134.

While the example of FIG. 1 illustrates the collection of data by the mobile device 102 from a specific number of locations, the example mobile device 102 may collect data from any number of locations while traveling within the example geographic area 104 of FIG. 1. As described in greater detail below in connection with FIG. 2, the mobile device 102 collects data at a specified collection frequency that may be distance-based and/or time-based, and that may also be dynamically adjusted based on changes and/or fluctuations in the remaining battery life and/or the remaining storage capacity of the mobile device 102.

Figure 2:
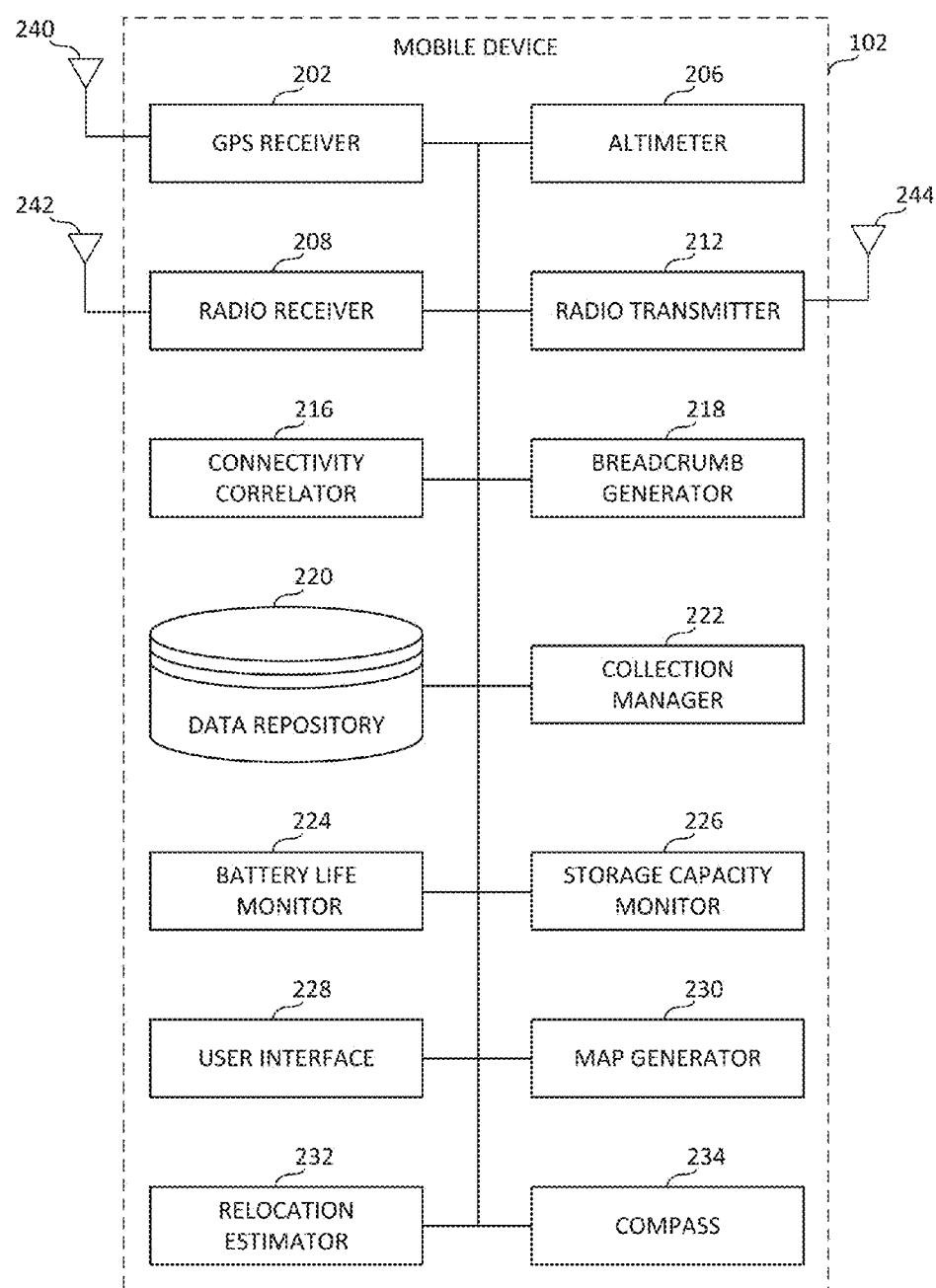
FIG. 2 is a block diagram of the example mobile device of FIG. 1.

FIG. 2 is a block diagram of the example mobile device 102 of FIG. 1 constructed in accordance with the teachings of this disclosure to identify communication service availability for the mobile device 102 using breadcrumbs. In the illustrated example of FIG. 2, the mobile device 102 includes an example GPS receiver 202, an example altimeter 206, an example radio receiver 208, an example radio transmitter 212, an example connectivity correlator 216, an example breadcrumb generator 218, an example data repository 220, an example collection manager 222, an example battery life monitor 224, an example storage capacity monitor 226, an example user interface 228, an example map generator 230, an example relocation estimator 232, and an example compass 234. However, other example implementations of the mobile device 102 may include fewer or additional structures to identify service availability for the mobile device 102 using breadcrumbs in accordance with the teachings of this disclosure.

In the illustrated example of FIG. 2, the example GPS receiver 202 collects, acquires and/or receives one or more signals from one or more GPS satellites, as described above. In the illustrated example, the GPS receiver 202 includes an example antennae 240 to facilitate the receipt of one or more signals from the one or more GPS satellites. The signal(s) received by the GPS receiver 202 may include information from which current the location of the mobile device 102 may be identified and/or derived, including for example, the current latitude, longitude and/or altitude of the mobile device 102. The signal(s) received by the GPS receiver 202 may also contain information from which the current time can be identified and/or derived. Data identified and/or derived from the signal(s) collected and/or received by the example GPS receiver 202 may be stored in a computer-readable storage medium such as the example data repository 220 described below.

In the illustrated example of FIG. 2, the example altimeter 206 senses and/or measures atmospheric pressure from which a corresponding altitude of the mobile device 102 can be determined. Thus, the altimeter 206 may be utilized as an additional and/or alternate means, relative to the GPS receiver 202, for identifying and/or deriving the current altitude of the mobile device 102. The altimeter 206 is able to sense, measure and/or determine the altitude of the mobile device 102 when cellular and/or Wi-Fi® signals are unavailable to the mobile device 102, and also when signals from GPS satellites are unavailable to the mobile device 102. In some examples, the altimeter 206 may utilize less power than the GPS receiver 202 in the course of determining the altitude of the mobile device 102. Data identified and/or derived from the measurements provided by the example altimeter 206 may be stored in a computer-readable storage medium such as the example data repository 220 described below.

In the illustrated example of FIG. 2, the example radio receiver 208 collects, acquires and/or receives one or more cellular and/or Wi-Fi® signals from one or more cellular base stations (e.g., the example cellular base stations 110, 112, 114 of FIG. 1) and/or one or more wireless access points (e.g., the example wireless access point 116 of FIG. 1), as described above. In the illustrated example, the radio receiver 208 includes an example antennae 242 to facilitate the receipt of one or more signals from the one or more cellular base stations and/or wireless access points. The signal(s) received by the radio receiver 208 may include information from which a network parameter (e.g., a network type parameter) and/or a signal parameter (e.g., a signal strength parameter, a signal bandwidth parameter, etc.) associated with the cellular and/or Wi-Fi® signal(s) being communicated between the mobile device 102 and the one or more cellular base stations and/or wireless access points may be identified and/or derived. The signal(s) received by the radio receiver 208 may contain additional and/or alternate parameters that may be utilized for the purpose of generating breadcrumbs and/or pathway records as disclosed herein.

In some examples, the signal(s) received by the radio receiver 208 may also contain information that assists with identifying the location of the mobile device 102 at a given time. For example, the radio receiver 208 may receive cellular and/or Wi-Fi® signals via which the mobile device 102 may implement an Assisted GPS (A-GPS) process and/or Location Based Services (LBS). Data identified and/or derived from the signal(s) collected and/or received by the example radio receiver 208 may be stored in a computer-readable storage medium such as the example data repository 220 described below.

In the illustrated example of FIG. 2, the example radio transmitter 212 transmits one or more cellular and/or Wi-Fi® signals to one or more cellular base stations (e.g., the example cellular base stations 110, 112, 114 of FIG. 1) and/or one or more wireless access points (e.g., the example wireless access point 116 of FIG. 1). In the illustrated example, the radio transmitter 212 includes an example antennae 244 to facilitate the transmission of one or more signals to the one or more cellular base stations and/or wireless access points. In some examples, the transmission of one or more signals from the example radio transmitter 212 to the one or more cellular base stations and/or wireless access points may result in the one or more base stations and/or wireless access points transmitting to the example radio receiver 208 one or more signals including information from which the connectivity data described above may be identified and/or derived.

In some examples, the radio transmitter 212 of FIG. 2 may transmit and/or upload one or more of the breadcrumbs and/or pathway records (e.g., the example pathway records 302, 304, 306, 308, 310, 312, 314, 316 and/or the example data structure 300 described below in connection with FIG. 3) to a server for inclusion in a pathway record database.

The pathway record database may include crowd-sourced pathway records with which the pathway data records transmitted and/or uploaded by the example radio transmitter 212 may be pooled. The development and/or maintenance of such crowd-sourced pathway records may expand the universe of pathway record data that is available to be downloaded by a community of mobile device users who may be traveling within geographic areas that are common and/or overlapping with respect to the example geographic area 104 of FIG. 1. The crowd-sourced pathway records may be pooled, grouped and or categorized by cellular service provider (e.g., AT&T®, Verizon®, T-Mobile®, Sprint®, etc.) such that the coverage area(s) associated with a particular service provider may be known by the community of mobile device users who may be traveling within geographic areas that are common and/or overlapping with respect to the example geographic area 104 of FIG. 1. In some instances, the availability of such crowd-sourced, carrier-specific pathway records may assist the mobile device user in selecting a travel pathway and/or destination. Data to be transmitted by the example radio transmitter 212 may be stored in a computer-readable storage medium such as the example data repository 220 described below.

In the illustrated example of FIG. 2, the example connectivity correlator 216 assigns, attributes and/or associates one or more available communication service(s) to and/or with the cellular and/or Wi-Fi® signals that have been collected and/or received at respective locations by the example radio receiver 208 of the mobile device 102 from one or more cellular base stations (e.g., the example cellular base stations 110, 112, 114 of FIG. 1) and/or wireless access points (e.g., the example wireless access point 116 of FIG. 1). For example, following and/or in conjunction with the collection of data by the mobile device 102 as described above in connection with FIG. 1, the example connectivity correlator 216 assigns, attributes and/or associates one or more available communication service(s) to and/or with the cellular and/or Wi-Fi® signals that have been collected and/or received by the mobile device 102 at each of the example first location 120, the example second location 122, the example third location 124, the example fourth location 126, the example fifth location 128, the example sixth location 130, the example seventh location 132 and the example eighth location 134.

The example connectivity correlator 216 determines the type(s) of available communication service(s) to assign, attribute and/or associate to and/or with the collected and/or received cellular and/or Wi-Fi® signals based on a network parameter and/or a signal parameter identified and/or derived from the collected and/or received signals. In some examples, the network parameter identifies the type of network from which a signal was received. For example, the network type may be a LTE network, a W-CDMA network, a GSM network, etc., or, more broadly, a 4G network, a 3G network, a 2G network, etc. In some examples, the signal parameter identifies the strength of the received signal. For example, the signal strength may be identified and/or expressed as a numerical value in Decibel-milliwatts (dBm).

The example connectivity correlator 216 correlates and/or associates one or more available communication services with the network parameter and/or the signal parameter, either alone or in combination, based on a predetermined correlation list, table and/or matrix. For example, based on the predetermined correlation list, table and/or matrix, the connectivity correlator 216 may determine that the respective network parameter(s) and/or signal parameter(s) of the example cellular signal(s) received by the mobile device 102 from the example first cellular base station 110 at the example first location 120 of FIG. 1 correspond to available communication services that include text messaging, voice calling, network browsing and streaming media.

In some examples, based on the predetermined correlation list, table and/or matrix, the connectivity correlator 216 may determine that the respective network parameter(s) and/or signal parameter(s) of the example cellular signal(s) received by the mobile device 102 from a cellular base station (e.g., the example third cellular base station 114) at a specific location correspond to the unavailability of any communication services at the specific location. For example, the connectivity correlator 216 may determine that the value of a signal parameter (e.g., a signal strength) associated with a cellular signal received by the mobile device 102 from a cellular base station at a specific location is too low and/or too minimal to support any type of communication service. In such an example, the connectivity correlator 216 correlates and/or associates a lack of available communication services with the specific location (e.g., the connectivity correlator 216 determines that the available communication services for the mobile device 102 associated with the specific location are "NONE.").

In instances where the connectivity correlator 216 has not identified and/or recognized the receipt of a cellular and/or Wi-Fi® signal by the mobile device 102 in connection with a location at which the mobile device 102 has collected data, the connectivity correlator 216 correlates and/or associates a lack of available communication services with the location. For example, the connectivity correlator 216 may determine that the failure of the mobile device 102 to receive any cellular or Wi-Fi® signals at the example third location 124 of FIG. 1 corresponds to the unavailability of any communication services at the third location 124 (e.g., the connectivity correlator 216 determines that the available communication services for the mobile device 102 associated with the third location 124 are "NONE."). In some examples, the lack of any available communication services may be determined by the connectivity correlator 216 based on the predetermined correlation list, table and/or matrix.

The predetermined correlation list, table and/or matrix utilized by the example connectivity correlator 216 may be of any format and may include any number of factors and/or fields to be utilized in determining the available communication service(s) to be assigned, attributed and/or associated to and/or with the respective signals received by the mobile device 102 from any cellular base station (e.g., the example cellular base stations 110, 112, 114 of FIG. 1) and/or wireless access point (e.g., the example wireless access point 116 of FIG. 1). The predetermined correlation list, table and/or matrix, along with data corresponding to any determination(s) and/or association(s) made by the example connectivity correlator 216 may be stored in a computer-readable storage medium such as the example data repository 220 described below.

In the illustrated example of FIG. 2, the example breadcrumb generator 218 generates breadcrumbs and/or pathway records corresponding to the respective locations at which signals have been collected and/or received by the example GPS receiver 202, the example altimeter 206 and/or the example radio receiver 208 of the mobile device 102, and further based on the processing of such signals by the example connectivity correlator 216. For example, following and/or in conjunction with the collection of data by the mobile device 102 as described above in connection with FIG. 1, the example breadcrumb generator 218 generates a separate breadcrumb and/or pathway record corresponding to the signals collected and/or received by the mobile device 102 at each of the example first location 120, the example second location 122, the example third location 124, the example fourth location 126, the example fifth location 128, the example sixth location 130, the example seventh location 132 and the example eighth location 134.

The breadcrumbs and/or pathway records generated by the breadcrumb generator 218 may include timing data indicative of a collection time. The breadcrumbs and/or pathway records generated by the breadcrumb generator 218 may additionally and/or alternately include location data indicative of a collection location of the mobile device 102 at the collection time. The breadcrumbs and/or pathway records generated by the breadcrumb generator 218 may additionally and/or alternately include data indicative of available communication services for the mobile device 102 at the collection location as determined by the example connectivity correlator 216. The breadcrumbs and/or pathway records generated by the breadcrumb generator 218 may additionally and/or alternately include connectivity data upon which the example connectivity correlator 216 has based its determination of the available communication services for the mobile device 102 at the collection location. In some examples, the connectivity data may include a signal parameter (e.g., signal strength) and/or a network parameter (e.g., network type) associated with a signal received by the mobile device 102 at the collection location.

The example breadcrumbs and/or pathway records generated by the example breadcrumb generator 218 may include more, less and/or alternate data and/or information relative to the data and/or information contained within, carried by and/or represented by the signals that have been collected and/or received by the mobile device 102. The example breadcrumbs and/or pathway records generated by the example breadcrumb generator 218 may also include more, less and/or alternate data and/or information relative to the data and/or information derived from the signals that have been collected and/or received by the mobile device 102. The example breadcrumbs and/or pathway records generated by the example breadcrumb generator 218 may take the form of computer-readable data records and/or data structures capable of being stored in a computer-readable storage medium such as the example data repository 220 described below.

FIG. 3 is an example data structure 300 containing example breadcrumbs and/or pathway records 302, 304, 306, 308, 310, 312, 314, 316 generated by the example breadcrumb generator 218 of FIG. 2. In connection with FIG. 3, each pathway record 302, 304, 306, 308, 310, 312, 314, 316 is illustrated as a row in the example data structure 300. In the illustrated example, the pathway records 302, 304, 306, 308, 310, 312, 314, 316 are based on data collected by the example mobile device 102 of FIGS. 1-2 at corresponding locations 120, 122, 124, 126, 128, 130, 132, 134 within the example geographic area 104 of FIG. 1. For example, a first pathway record 302 generated by the breadcrumb generator 218 corresponds to data collected by the mobile device 102 at the first location 120 within the example geographic area 104 of FIG. 1. Similarly, a second pathway record 304 corresponds to data collected at the second location 122, a third pathway record 306 corresponds to data collected at the third location 124, a fourth pathway record 308 corresponds to data collected at the fourth location 126, a fifth pathway record 310 corresponds to data collected at the fifth location 128, a sixth pathway record 312 corresponds to data collected at the sixth location 130, a seventh pathway record 314 corresponds to data collected at the seventh location 132, and an eighth pathway record 316 corresponds to data collected at the eighth location 134.

In the illustrated example of FIG. 3, respective ones of the generated breadcrumbs and/or pathway records 302, 304, 306, 308, 310, 312, 314, 316 included in the example data structure 300 include an example breadcrumb identifier field 318, example timing data 320, example location data 322, and example connectivity data 324. In the illustrated example, the example breadcrumb identifier field 318 includes a unique identifier assigned to each breadcrumb and/or pathway record by the example breadcrumb generator 218. For example, the first pathway record 302 includes a breadcrumb identifier of "0001," while the second pathway record 304 includes a breadcrumb identifier of "0002."

In the illustrated example of FIG. 3, the example timing data 320 includes an example time field 326 indicating a time at which the data associated with the breadcrumb and/or pathway record was collected by the mobile device 102. For example, the first pathway record 302 includes a time of "09:10:00," while the second pathway record 304 includes a time of "09:20:00," indicating that the data associated with the second pathway record 304 was collected ten (10) minutes after the data associated with the first pathway record 302. The example timing data 320 may be identified and/or derived by the mobile device 102 based on one or more signal(s) received from one or more GPS satellites as described above in connection with FIG. 1. The example timing data 320 may additionally be identified and/or derived by the mobile device 102 based on one or more signal(s) received from one or more cellular base stations and/or wireless access points, such as the example cellular base stations 110, 112, 114 and/or the example wireless access point 116 of FIG. 1. The example timing data 320 may include additional and/or alternate fields and/or formats relative to the example time field 326 described above in connection with FIG. 3.

In the illustrated example of FIG. 3, the example location data 322 includes an example latitude field 328, an example longitude field 330 and an example altitude field 332 indicating the respective latitude, longitude and altitude of the mobile device 102 at the time that the data associated with the breadcrumb and/or pathway record was collected by the mobile device 102. For example, the first pathway record 302 includes a latitude of "41.3148," a longitude of "−76.3011," and an altitude of "655 m," while the second pathway record 304 includes a latitude of "41.3180," a longitude of "−76.2998," and an altitude of "650 m." The respective latitudes, longitudes and altitudes indicate changes in the location of the mobile device 102 within the example geographic area 104 of FIG. 1. For example, the respective latitudes, longitudes and altitudes described above in relation to the example first pathway record 302 and the example second pathway record 304 indicate that the second pathway record 304 corresponds to a location positioned to the northeast of the location to which the example first pathway record 302 corresponds, and that the location corresponding to the second pathway record 304 is positioned at a lower elevation relative to the location corresponding to the first pathway record 302.

The example location data 322 may be identified and/or derived by the mobile device 102 based on one or more signal(s) received from one or more GPS satellites as described above in connection with FIG. 1. The example location data 322 may additionally be identified and/or derived by the mobile device 102 based on one or more signal(s) received from one or more cellular base stations and/or wireless access points, such as the example cellular base stations 110, 112, 114 and/or the example wireless access point 116 of FIG. 1. Some of the example location data 322, such as the altitude, may additionally and/or alternatively be identified and/or derived by the mobile device 102 based on one or more measurements provided by the example altimeter 206 of FIG. 2, as described above. The example location data 322 may include additional, fewer and/or alternate fields and/or formats relative to the example latitude field 328, the example longitude field 330 and/or the example altitude field 332 described above in connection with FIG. 3.

In the illustrated example of FIG. 3, the example connectivity data 324 includes an example network type field 334, an example signal strength field 336 and an example available communication service type field 338 indicating the respective network type, signal strength, and correlated available communication service type(s) associated with a cellular and/or Wi-Fi® signal transmitted from and/or received by the mobile device 102 at the time that the data associated with the breadcrumb and/or pathway record was collected by the mobile device 102. For example, the first pathway record 302 includes a network type of "LTE" and a signal strength of "−65 dBm," together having a correlated available communication service type indicating the availability of text messaging, voice calling, network browsing and media streaming. The example third pathway record 306 includes a network type of "NONE," a signal strength of "NONE," and a correlated available communication service type of "NONE," indicating that the location associated with the third pathway record 306 is within a non-service area such as the example non-service area 108 of FIG. 1.

The example connectivity data 324 may be identified and/or derived by the mobile device 102 based on one or more signal(s) received from one or more cellular base stations and/or wireless access points, such as the example cellular base stations 110, 112, 114 and/or the example wireless access point 116 of FIG. 1. The example available communication service type field 338 includes data that is generated and/or derived by the example connectivity correlator 216 of FIG. 2, as described above. The example connectivity data 324 may include additional, fewer and/or alternate fields and/or formats relative to the example network type field 334, the example signal strength field 336 and/or the example available communication service type field 338 described above in connection with FIG. 3. For example, the connectivity data 324 may additionally and/or alternatively include an example service provider field that includes data indicating the service provider and/or carrier associated with the cellular signal transmitted from and/or received by the mobile device 102 at the time that the data associated with the breadcrumb and/or pathway record was collected by the mobile device 102.

As illustrated in FIG. 3, the connectivity correlator 216 of FIG. 2 may in some instances assign, attribute and/or associate different ranges of available communication services to separate breadcrumbs and/or pathway records even though the separate breadcrumbs and/or pathway records may both be associated with the same network type. For example, although both of the first example pathway record 302 and the second example pathway record 304 are associated with a network type of "LTE," the range of available communication services associated with the second pathway record 304 is narrower, fewer and/or less than the range of available communication services associated with the first pathway record 302. In the illustrated example, the difference in the range of available communication services respectively associated with the first pathway record 302 and the second pathway record 304 is attributable to the difference in signal strengths respectively associated with the first pathway record 302 and the second pathway record 304.

As illustrated in FIG. 3, the connectivity correlator 216 of FIG. 2 may in some instances assign, attribute and/or associate different ranges of available communication services to separate breadcrumbs and/or pathway records even though the separate breadcrumbs and/or pathway records may both be associated with similar signal strengths. For example, although both of the fourth example pathway record 308 and the sixth example pathway record 312 are associated with a signal strength of "−90 dBm," the range of available communication services associated with the sixth pathway record 312 is narrower, fewer and/or less than the range of available communication services associated with the fourth pathway record 308. In the illustrated example, the difference in the range of available communication services respectively associated with the fourth pathway record 308 and the sixth pathway record 312 is attributable to the difference in network type respectively associated with the fourth pathway record 308 and the sixth pathway record 312.

Returning to the example of FIG. 2, the example data repository 220 stores the breadcrumbs and/or pathway records (e.g., the example pathway records 302, 304, 306, 308, 310, 312, 314, 316 and/or the example data structure 300 of FIG. 3). The data repository 220 may additionally store some or all of the underlying data (e.g., any portion of the example timing data 320, the example location data 322 and/or the example connectivity data 324 of FIG. 3) collected by the example mobile device 102 in connection with the generation of the breadcrumbs and/or pathway records. The data repository 220 may additionally store some or all of the data and/or data structures received by, transmitted from, utilized by, and/or measured by any of the example GPS receiver 202, the example altimeter 206, the example radio receiver 208, the example radio transmitter 212, the example connectivity correlator 216, the example breadcrumb generator 218, the example collection manger 222, the example battery life monitor 224, the example storage capacity monitor 226, the example user interface 228, the example map generator 230, the example relocation estimator 232, or the example compass 234 of FIG. 2.

The example data repository 220 of FIG. 2 may be implemented by any type(s) and/or any number(s) of a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which information is stored for any duration (e.g., for extended time periods, permanently, brief instances, for temporarily buffering, and/or for caching of the information). The information stored in the example data repository 220 may be stored in any file and/or data structure format, organization scheme, and/or arrangement. The information stored in the example data repository 220 is accessible to the example radio transmitter 212, the example connectivity correlator 216, the example breadcrumb generator 218, the example collection manger 222, the example user interface 228, the example map generator 230, the example relocation estimator 232 and the example compass 234 of FIG. 2, and/or, more generally, to the example mobile device 102 of FIGS. 1-2.

In the illustrated example of FIG. 2, the example collection manager 222 controls the initiation and/or frequency at which data and/or signals are collected and/or transmitted by the example GPS receiver 202, the example altimeter 206, the example radio receiver 208 and/or the example radio transmitter 212. For example, the collection manager 222 identifies, determines, establishes and/or implements a collection frequency that is thereafter used by the collection manager 222 to control the collection and/or transmission of data and/or signals by the example GPS receiver 202, the example altimeter 206, the example radio receiver 208 and/or the example radio transmitter 212. In some examples, the collection frequency is configurable such that the collection frequency that is identified, determined, established and/or implemented by the collection manager 222 may be initiated, modified, changed and/or discontinued in response to one or more inputs and/or signals communicated to the collection manager 222 via the example user interface 228 and/or any other component of the mobile device 102 described in connection with FIG. 2.

In some examples, the collection frequency that is identified, determined, established and/or implemented by the collection manager 222 is based on a threshold change in time (e.g., a timing threshold) for the mobile device 102 relative to the collection time of a most-recently generated one of the breadcrumbs and/or pathway records (e.g., the example pathway records 302, 304, 306, 308, 310, 312, 314, 316 of FIG. 3). For example, the collection manager 222 may identify, determine, establish and/or implement a collection frequency via which the collection manager 222 instructs the example GPS receiver 202, the example altimeter 206, the example radio receiver 208 and/or the example radio transmitter 212 to attempt to collect data and/or signals at an interval corresponding to ten (10) minutes relative to the collection time associated with the most-recently generated one of the breadcrumbs and/or pathway records. Such an example collection frequency may result in the example data and/or signals collected by the mobile device 102 at the example locations 120, 122, 124, 126, 128, 130, 132 and 134 of FIG. 1 having associated timing data that is spaced apart by ten (10) minute intervals, as is shown in relation to the example corresponding pathway records 302, 304, 306, 308, 310, 312, 314, 316 of FIG. 3. The example collection manger 222 determines whether the example timing threshold has been satisfied by monitoring the timing data associated with signals that are received by the mobile device 102 via the example GPS receiver 202 and/or the example radio receiver 208. In some examples, the collection manager 222 may additionally and/or alternately determine whether the example timing threshold has been satisfied by monitoring an internal clock of the mobile device 102.

In some examples, the collection frequency that is identified, determined, established and/or implemented by the collection manager 222 is based on a threshold change in location and/or distance (e.g., a location threshold) of the mobile device 102 relative to the collection location of a most-recently generated one of the breadcrumbs and/or pathway records (e.g., the example pathway records 302, 304, 306, 308, 310, 312, 314, 316 of FIG. 3). For example, the collection manager 222 may identify, determine, establish and/or implement a collection frequency via which the collection manager 222 instructs the example GPS receiver 202, the example altimeter 206, the example radio receiver 208 and/or the example radio transmitter 212 to attempt to collect data and/or signals at an interval corresponding to four-hundred (400) meters relative to the collection location associated with the most-recently generated one of the breadcrumbs and/or pathway records. Such an example collection frequency may result in the example data and/or signals collected by the mobile device 102 at the example locations 120, 122, 124, 126, 128, 130, 132 and 134 of FIG. 1 having associated location data that is spaced apart by four-hundred (400) meter intervals. The example collection manger 222 determines whether the example location threshold has been satisfied by monitoring the location data associated with signals that are received by the mobile device 102 via the example GPS receiver 202 and/or the example radio receiver 208. In some examples, the collection manager 222 may additionally and/or alternately determine whether the example location threshold has been satisfied by monitoring the example altimeter 206 of the mobile device 102.

In some examples, the collection frequency that is identified, determined, established and/or implemented by the collection manager 222 is based on one or more threshold changes in a dynamic variable and/or parameter such as, for example, the remaining battery life of the mobile device 102. For example, the collection manager 222 may identify, determine, establish and/or implement a collection frequency that dynamically changes based on data obtained, generated, determined and/or provided by the example battery life monitor 224 of FIG. 2. The remaining power and/or life associated with a battery of the mobile device 102 will typically decrease while the mobile device 102 is in use, such as when the mobile device 102 is collecting data to be used for the generation of breadcrumbs and/or pathway records according to the processes described above. The example battery life monitor 224 senses and/or measures the remaining power and/or life associated with the battery of the mobile device 102 and communicates a corresponding remaining battery life measurement and/or parameter to the collection manger 222.

Based on a remaining battery life threshold identified, determined, established and/or implemented by the collection manager 222, the collection manager 222 may modify, change and/or adjust the collection frequency that has otherwise been identified, determined, established and/or implemented by the collection manager 222. For example, the collection manager 222 may implement an example collection frequency that instructs the example GPS receiver 202, the example altimeter 206, the example radio receiver 208 and/or the example radio transmitter 212 to attempt to collect data and/or signals at an interval corresponding to ten (10) minutes when the remaining battery life is above twenty percent (20%), and at an adjusted interval corresponding to twenty (20) minutes when the remaining battery life is equal to or below twenty percent (20%). The collection manager 222 may additionally and/or alternatively implement an example collection frequency that instructs the example GPS receiver 202, the example altimeter 206, the example radio receiver 208 and/or the example radio transmitter 212 to attempt to collect data and/or signals at an interval corresponding to four-hundred (400) meters when the remaining battery life is above twenty percent (20%), and at an adjusted interval corresponding to eight-hundred (800) minutes when the remaining battery life is equal to or below twenty percent (20%).

The example collection manger 222 determines whether the example remaining battery life threshold has been satisfied by evaluating the remaining battery life parameter provided periodically by the example battery life monitor 224. Dynamically decreasing the collection frequency as the remaining battery life of the mobile device 102 decreases may preserve, conserve and/or prolong the ability of the mobile device 102 to operate. The preservation and/or conservation of battery life may become critical in instances, conditions and/or locations where an end user is without the ability to recharge the battery of the mobile device 102.

In some examples, the collection frequency that is identified, determined, established and/or implemented by the collection manager 222 is based on one or more threshold changes in a dynamic variable and/or parameter such as, for example, the remaining storage capacity of the mobile device 102. For example, the collection manager 222 may identify, determine, establish and/or implement a collection frequency that dynamically changes based on data obtained, generated, determined and/or provided by the example storage capacity monitor 226 of FIG. 2. The remaining storage capacity associated with a storage medium (e.g., the example data repository 220 of FIG. 2) of the mobile device 102 will typically decrease while the mobile device 102 is in use, such as when the mobile device 102 is collecting data to be used for the generation of breadcrumbs and/or pathway records according to the processes described above. The example storage capacity monitor 226 senses and/or measures the remaining storage capacity associated with the storage medium of the mobile device 102 and communicates a corresponding remaining storage capacity measurement and/or parameter to the collection manger 222.

Based on a remaining storage capacity threshold identified, determined, established and/or implemented by the collection manager 222, the collection manager 222 may modify, change and/or adjust the collection frequency that has otherwise been identified, determined, established and/or implemented by the collection manager 222. For example, the collection manager 222 may implement an example collection frequency that instructs the example GPS receiver 202, the example altimeter 206, the example radio receiver 208 and/or the example radio transmitter 212 to attempt to collect data and/or signals at an interval corresponding to ten (10) minutes when the remaining storage capacity is above ten percent (10%), and at an interval corresponding to twenty (20) minutes when the remaining storage capacity is equal to or below ten percent (10%). The collection manager 222 may additionally and/or alternatively implement an example collection frequency that instructs the example GPS receiver 202, the example altimeter 206, the example radio receiver 208 and/or the example radio transmitter 212 to attempt to collect data and/or signals at an interval corresponding to four-hundred (400) meters when the remaining storage capacity is above ten percent (10%), and at an adjusted interval corresponding to eight-hundred (800) minutes when the remaining storage capacity is equal to or below ten percent (10%).

The example collection manger 222 determines whether the example remaining storage capacity threshold has been satisfied by evaluating the remaining storage capacity parameter provided periodically by the example storage capacity monitor 226. Dynamically decreasing the collection frequency as the remaining storage capacity of the mobile device 102 decreases may preserve and/or conserve the ability of the mobile device 102 to continue to collect and store data without previously-stored data having to be deleted.

In some examples, the collection frequency that is identified, determined, established and/or implemented by the collection manager 222 may include any and/or all of the example timing threshold, the example location threshold, the example remaining battery life threshold and/or the example remaining storage capacity threshold described above. In some such examples, the collection manager 222 may instruct the example GPS receiver 202, the example altimeter 206, the example radio receiver 208 and/or the example radio transmitter 212 to attempt to collect data upon the earlier of the timing threshold or the location threshold being satisfied, as adjusted by satisfaction of either of the remaining battery life threshold or the remaining storage capacity threshold.

In some disclosed examples, the collection manager 222 may cause at least one of the example GPS receiver 202, the example radio receiver 208 and/or the example radio transmitter 212 of the mobile device 102 to be powered off during a period of time at which data is not being collected for the generation of breadcrumbs and/or pathway records. In such examples, the collection manager 222 may cause some or all of the example GPS receiver 202, the example radio receiver 208 and/or the example radio transmitter 212 of the mobile device 102 to power back on once the collection manager 222 has determined that any of the example thresholds described above (e.g., the example timing threshold, the example location threshold, the example remaining battery life threshold and/or the remaining storage capacity threshold) has been satisfied, such that the mobile device 102 is thereafter able to collect data as instructed by the collection manager 222 and/or the collection frequency thereof.

The example timing threshold, the example location threshold, the example remaining battery life threshold, the example remaining battery life parameter, the example remaining storage capacity threshold and/or the example remaining storage capacity parameter associated with the example collection manager 222, the example battery life monitor 224 and/or the example storage capacity monitor 226 may take the form of computer-readable data records and/or data structures capable of being stored in a computer-readable storage medium such as the example data repository 220 described above.

In the illustrated example of FIG. 2, the example user interface 228 facilitates interactions and/or communications between an end user and the mobile device 102. The example user interface 228 includes one or more output devices via which the user interface 228 presents information and/or data in textual, graphical and/or audible form to the end user of the mobile device 102. For example, the user interface 228 may include a liquid crystal display for presenting textual and/or graphical information, and speakers for presenting audible information. The example user interface 228 also includes one or more input devices via which the user interface 228 receives information and/or data from the end user of the mobile device 102. For example, the user interface 228 may include a keyboard, a mouse, a microphone and/or a liquid crystal display having a touchscreen that enable(s) the end user to convey data and/or commands to the mobile device 102. Data and/or information that is presented and/or received via the user interface 228 may be of any type, form and/or format, and may be stored in the example data repository 220.

In the illustrated example of FIG. 2, the example map generator 230 generates one or more example maps based on the collection locations associated with respective ones of the example breadcrumbs and/or pathway records (e.g., the example pathway records 302, 304, 306, 308, 310, 312, 314, 316 of FIG. 3). The map generated by the map generator 230 may include a graphical representation and/or indication of the collection locations associated with respective ones of the example breadcrumbs and/or pathway records. The map generated by the map generator 230 may also include a graphical representation and/or indication of the available communication services corresponding to the collection locations associated with respective ones of the example breadcrumbs and/or pathway records. In some examples, the map generated by the map generator 230 may incorporate, include and/or be based on one or more known area maps stored on the mobile device 102 representing one or more geographic areas that are common and/or overlapping with respect to the collection locations associated with respective ones of the example breadcrumbs and/or pathway records and/or, more generally, with respect to the example geographic area 104 of FIG. 1.

In some examples, the map generated by the map generator 230 includes a graphical representation and/or indication of an example trail and/or pathway corresponding to a time-ordered sequence of the example breadcrumbs and/or pathway records. The example trail may include an indication of a starting point associated with the least-recent pathway record from among the time-ordered sequence of pathway records, and an ending point associated with the most-recent pathway record from among the time-ordered sequence of pathway records. In some examples, the ending point of the example trail may correspond to the current location of the mobile device 102. In some examples, the collection locations and/or available communication services associated with respective ones of the example breadcrumbs and/or pathway records may be marked and/or identified along the example trail. The example trail and/or, more generally, the example map, may be presented graphically via the example user interface 228 of FIG. 2 for display on the mobile device 102.

Figure 4:
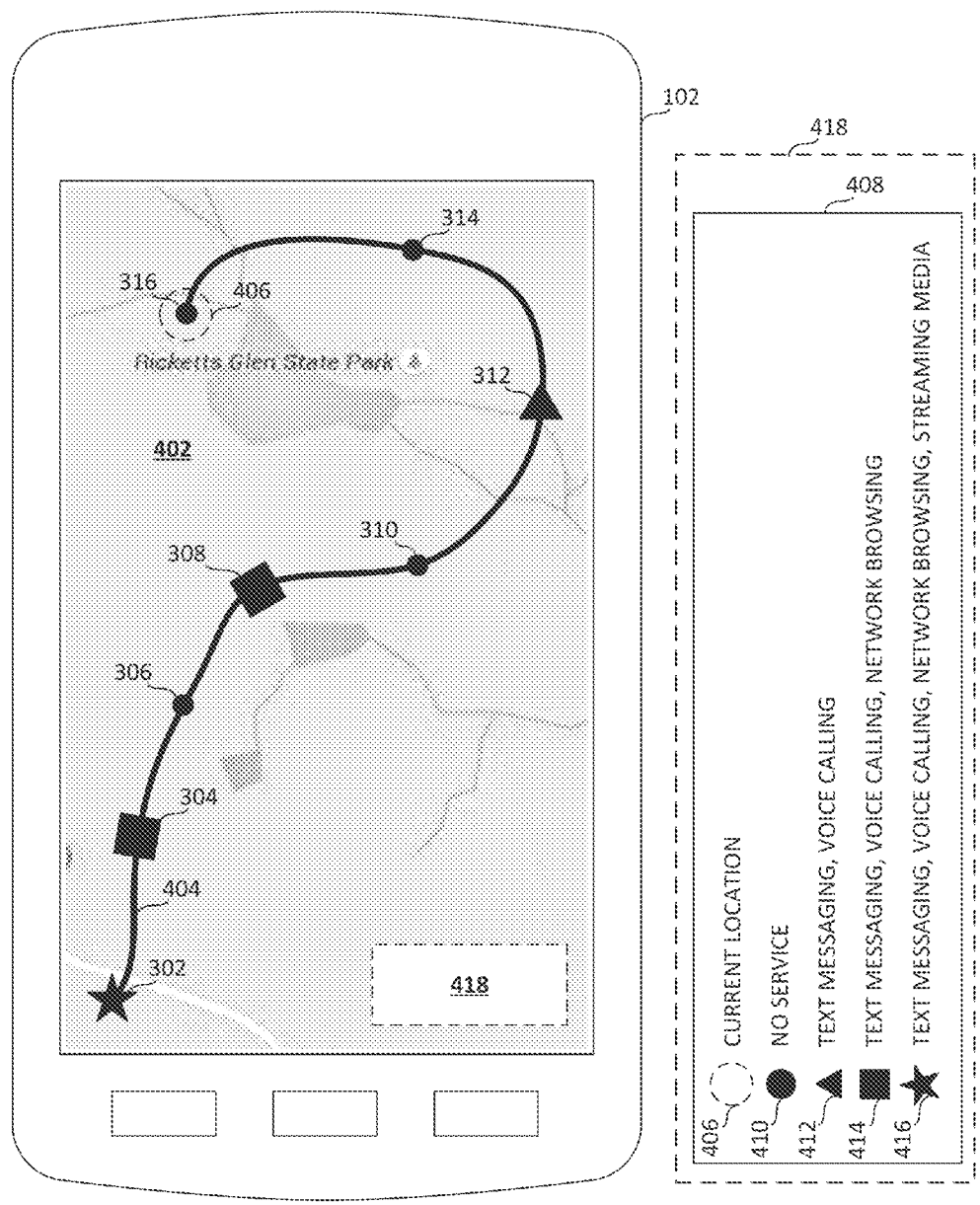
FIG. 4 is an example map presented via the example user interface of FIG. 2 including an example trail indicating example communication services that are available to the example mobile device of FIGS. 1-2 along the trail.

FIG. 4 is an example map 402 presented via the example user interface 228 of FIG. 2 including indications of an example trail 404 and example types of communication services that are available to the example mobile device 102 of FIGS. 1-2 at collection locations along the trail 404. The example map 402 includes a graphical representation and/or indication of the example breadcrumbs and/or pathway records 302, 304, 306, 308, 310, 312, 314, 316 based on the respective collection locations associated therewith (e.g., the respective locations 120, 122, 124, 126, 128, 130, 132, 134 of FIG. 1). The example trail 404 of the map 402 represents a time-ordered sequence of the example pathway records 302, 304, 306, 308, 310, 312, 314, 316. The trail 404 includes a starting point corresponding to the example first pathway record 302, and an ending point corresponding to the example eighth pathway record 316. In the illustrated example, the map 402 includes a graphical representation and/or indication of an example current location 406 of the mobile device 102. In the illustrated example, the current location 406 of the mobile device 102 is co-located with the example ending point of the trail 404 corresponding to the example eighth pathway record 316.

In the illustrated example of FIG. 4, the example map 402 includes a graphical representation and/or indication of the available communication services corresponding to the collection locations associated with respective ones of the example pathway records 302, 304, 306, 308, 310, 312, 314, 316. For example, the map 402 indicates that no communication services are available to the mobile device 102 at the respective collection locations associated with the example third pathway record 306, the example fifth pathway record 310, the example seventh pathway record 314 and the example eighth pathway record 316. The map 402 further indicates that text messaging and voice calling communication services are available to the mobile device 102 at the collection location associated with the example sixth pathway record 312. The map 402 further indicates that text messaging, voice calling and network browsing communication services are available to the mobile device 102 at the respective collection locations associated with the example second pathway record 304 and the example fourth pathway record 308. The map 402 further indicates that text messaging, voice calling, network browsing and streaming media communication services are available to the mobile device 102 at the collection location associated with the example first pathway record 302.

In the illustrated example of FIG. 4, the example map 402 also includes and/or is associated with a textual representation and/or indication of the available communication services corresponding to the collection locations associated with respective ones of the example pathway records 302, 304, 306, 308, 310, 312, 314, 316. For example, the map 402 may include an example legend 408 that correlates and/or associates one or more textual descriptions of the available communication services to one or more corresponding graphical icons. In the illustrated example of FIG. 4, the legend 408 associates an example circular icon 410 with no communication service availability. The legend 408 further associates an example triangular icon 412 with the combined availability of text messaging and voice calling communication services. The legend 408 further associates an example square-shaped icon 414 with the combined availability of text messaging, voice calling and network browsing communication services. The legend 408 further associates an example star-shaped icon 416 with the combined availability of text messaging, voice calling, network browsing and streaming media communication services. The example legend 408 may be of any form and/or format. For example, rather than associating a single graphical icon with a combination of multiple types of available communication services, the legend 408 may instead associate a unique graphical icon with each available type of communication service. In such an example, the map 402 may include multiple graphical icons in connection with representing and/or indicating the available communication services corresponding to a collection location associated with a particular pathway record. In the illustrated example of FIG. 4, the example legend 408 may be presented graphically and/or textually via the example user interface 228 of FIG. 2 for display on the mobile device 102 at an example display area 418.

Returning to the example of FIG. 2, the example relocation estimator 232 identifies and/or determines an example relocation pathway associated with relocating the mobile device 102 from an example current location to an example collection location associated with one of the breadcrumbs and/or pathway records at which a desired communication service may be available to the mobile device 102. In some examples, the relocation estimator 232 identifies the collection location based on an identification of the collection location specified and/or received via the example user interface 228. In other examples, the relocation estimator 232 determines, selects and/or identifies the collection location based on an identification of the desired communication service specified and/or received via the example user interface 228, and further based on determining the most proximate collection location, in terms of distance and/or time relative to the current location of the mobile device 102, that may support the identified desired communication service.

In some examples, the relocation estimator 232 determines the most proximate collection location relative to the current location of the mobile device 102 with specific reference to the example trail 404 of FIG. 4, such that the example relocation pathway tracks and/or follows the trail 404. In such examples, the relocation estimator 232 may determine the most proximate collection location along the example trail 404 in terms of distance and/or time relative to the current location of the mobile device 102 that may support the identified desired communication service by reverse-tracking, back-tracking and/or sorting through the time-ordered sequence of pathway records, beginning with the pathway record associated with the current location of the mobile device 102, until a pathway record having an available communication service that matches and/or supports the identified desired communication service is encountered and/or identified.

In some examples, the relocation estimator 232 determines the most proximate collection location relative to the current location of the mobile device 102 without regard to the example trail 404 of FIG. 4, such that the example relocation pathway need not necessarily track and/or follow the trail 404. In such examples, the relocation estimator 232 may determine the most proximate collection location in terms of distance and/or time relative to the current location of the mobile device 102 that may support the identified desired communication service by comparing the location data and/or timing data associated with the current location of the mobile device 102 to the location data and/or timing data associated with respective ones of the breadcrumbs and/or pathway records having an available communication service that matches and/or supports the identified desired communication service.

In some examples, the relocation estimator 232 identifies a first relocation pathway that tracks and/or follows the example trail 404 from the current location of the mobile device 102 to the most proximate location at which a desired communication service may be available to the mobile device 102. In some examples, the relocation estimator 232 identifies and/or determines an example first estimated relocation distance and/or an example first estimated relocation time associated with relocating the mobile device 102 along the first relocation pathway. The relocation estimator 232 may determine the first estimated relocation time by computing the difference between the timing data associated with the pathway record corresponding to the current location of the mobile device 102 and the timing data associated with the pathway record corresponding to the identified most proximate location at which a desired communication service may be available to the mobile device 102. The relocation estimator 232 may determine the first estimated relocation distance by computing the summed differences between the location data associated with consecutive time-ordered pathway records beginning with the pathway record corresponding to the current location of the mobile device 102 and ending with the pathway record corresponding to the identified most proximate location at which a desired communication service may be available to the mobile device 102.

In some examples, the relocation estimator 232 additionally and/or alternately identifies a second relocation pathway that indicates and/or provides the shortest possible pathway in terms of distance and/or time, without regard to the example trail 404, from the current location of the mobile device 102 to the most proximate location at which a desired communication service may be available to the mobile device 102. In some examples, the relocation estimator 232 identifies and/or determines an example second estimated relocation distance and/or an example second estimated relocation time associated with relocating the mobile device 102 along the second relocation pathway. The relocation estimator 232 may determine the second estimated relocation distance by computing the difference between the location data associated with the pathway record corresponding to the current location of the mobile device 102 and the location data associated with the pathway record corresponding to the identified most proximate location at which a desired communication service may be available to the mobile device 102. The relocation estimator 232 may determine the second estimated relocation time by computing an average speed of travel of the mobile device 102 over the course of the example trail 404 or some portion thereof (e.g., by dividing an identified distance traveled by an identified time of travel corresponding to the identified distance traveled), and applying the average speed of travel to the second estimated relocation distance (e.g., by multiplying the second estimated relocation distance by the computed average speed of travel).

Figure 5:
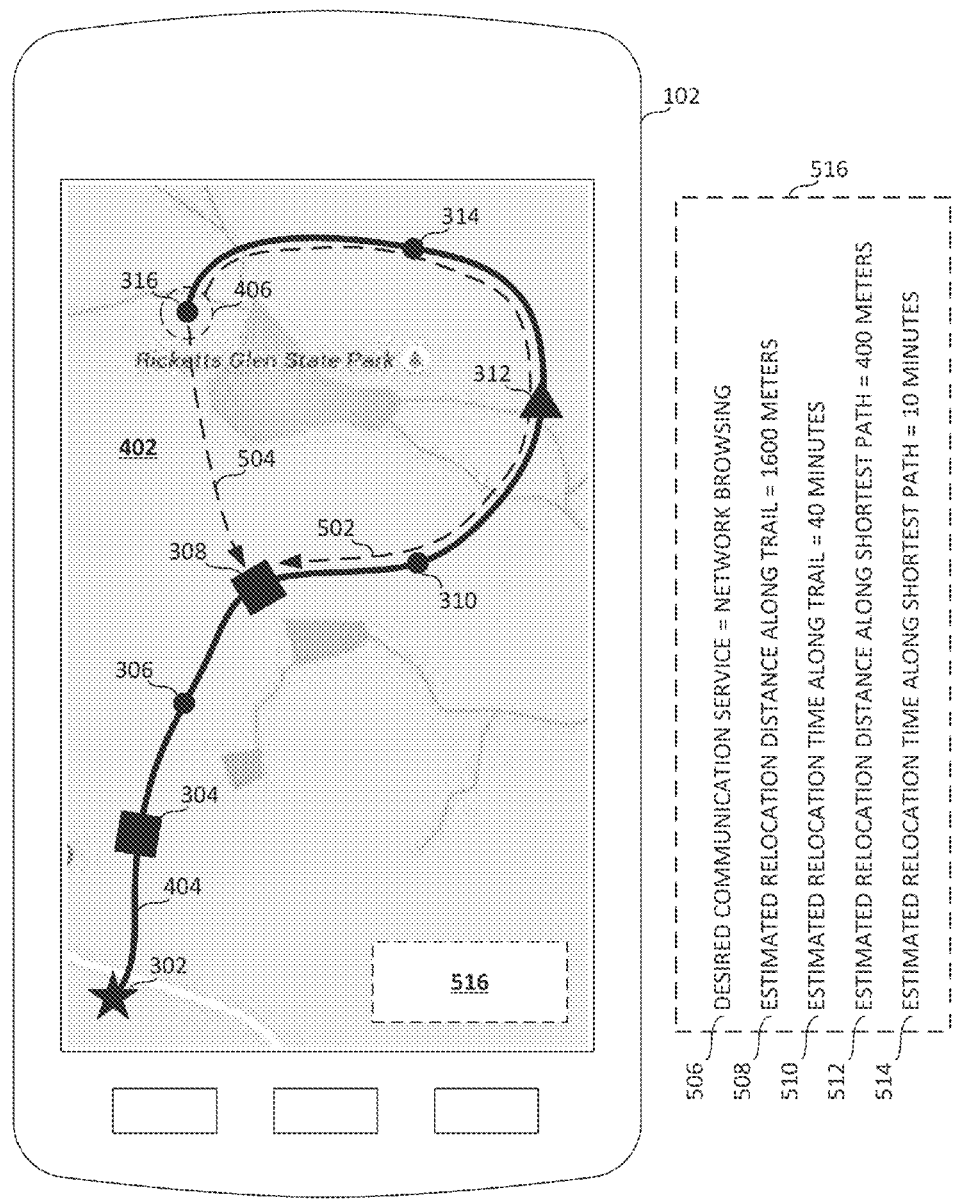
FIG. 5 is the example map of FIG. 4 including example relocation pathways associated with relocating the example mobile device of FIGS. 1-2 to an example collection location that supports an example identified desired communication service.

FIG. 5 is the example map 402 of FIG. 4 including example relocation pathways 502, 504 associated with relocating the example mobile device 102 of FIGS. 1-2 to an example collection location that supports an example identified desired communication service 506. In the illustrated example of FIG. 5, the desired communication service 506 has been communicated to the mobile device 102 via the example user interface 228 of FIG. 2 based on a notification, instruction, command and/or data conveyed to the user interface 228 by an end user of the mobile device 102. In the illustrated example of FIG. 5, the example desired communication service 506 is network browsing. As described above in connection with FIG. 4, the collection location corresponding to the example fourth pathway record 308 is associated with available communication services that include text messaging, voice calling and network browsing. Thus, the collection location corresponding to the example fourth pathway record 308 may be able to support the desired communication service 506 for the mobile device 102.

In the illustrated example of FIG. 5, the example first relocation pathway 502 tracks and/or follows the example trail 404, beginning with the example current location 406 of the mobile device 102 and ending with the example collection location corresponding to the example fourth pathway record 308. An indication of the example first relocation pathway 502 may be presented graphically via the example user interface 228 of FIG. 2 for display on the mobile device 102 in connection with the example map 402.

In the illustrated example of FIG. 5, the example first relocation pathway 502 is based on a determination by the example relocation estimator 232 of FIG. 2 that the collection location corresponding to the example fourth pathway record 308 is the most proximate location along the example trail 404 relative to the current location 406 of the mobile device 102 that may be able to support the desired communication service 506 for the mobile device 102. For example, the relocation estimator 232 may have determined that none of the example collection locations corresponding respectively to the example eighth pathway record 316, the example seventh pathway record 314, the example sixth pathway record 312 or the example fifth pathway record 310 along the example trail 404 may be able to support the desired communication service 506 (e.g., network browsing) for the mobile device 102.

In the illustrated example of FIG. 5, the example second relocation pathway 504 provides and/or represents the shortest possible pathway, without regard to the example trail 404, beginning with the example current location 406 of the mobile device 102 and ending with the example collection location corresponding to the example fourth pathway record 308. An indication of the example second relocation pathway 504 may be presented graphically via the example user interface 228 of FIG. 2 for display on the mobile device 102 in connection with the example map 402.

In the illustrated example of FIG. 5, the example second relocation pathway 504 is based on a determination by the example relocation estimator 232 of FIG. 2 that the collection location corresponding to the example fourth pathway record 308 is the most proximate location relative to the current location 406 of the mobile device 102 that may be able to support the desired communication service 506 for the mobile device 102. For example, the relocation estimator 232 may have determined that while the example collection locations corresponding respectively to the example first pathway record 302, the example second pathway record 304 and the example fourth pathway record 308 may each be able to support the desired communication service 506 (e.g., network browsing) for the mobile device 102, the collection location corresponding to the example fourth pathway record 308 is most proximate relative to the example current location 406 of the mobile device 102.

In the illustrated example of FIG. 5, the example relocation estimator 232 has determined an example first estimated relocation distance 508 of one-thousand six-hundred (1600) meters and an example first estimated relocation time 510 of forty (40) minutes for the example first relocation pathway 502. In the illustrated example, the example relocation estimator 232 has determined an example second estimated relocation distance 512 of four-hundred (400) meters and an example second relocation time 514 of ten (10) minutes for the example second relocation pathway 504. In the illustrated example, indications of one or more of the example desired communication service 506, the example first estimated relocation distance 508, the example first estimated relocation time 510, the example second estimated relocation distance 512 and/or the example second relocation time 514 may be presented graphically and/or textually via the example user interface 228 of FIG. 2 for display on the mobile device 102 at an example display area 516.

Returning to the example of FIG. 2, the example compass 234 provides directional information and/or estimated location information by sensing the relative strength of the Earth's magnetic field. The compass 234 may assist the mobile device 102 and/or the end user thereof with relocating to an identified location at which a desired communication service may be available to the mobile device 102. For example, the compass 234 may assist in directing the mobile device 102 and/or the end user thereof from the example current location 406 to the location associated with the example pathway record 308 along the example trail 404, along the example first relocation pathway 502 and/or along the example second relocation pathway 504 described above in connection with FIGS. 4-5.

While an example manner of implementing the example mobile device 102 of FIG. 1 is illustrated in FIG. 2, one or more of the elements, processes and/or devices illustrated in FIG. 2 may be combined, divided, re-arranged, omitted, eliminated and/or implemented in any other way. Further, the example GPS receiver 202, the example altimeter 206, the example radio receiver 208, the example radio transmitter 212, the example connectivity correlator 216, the example breadcrumb generator 218, the example data repository 220, the example collection manager 222, the example battery life monitor 224, the example storage capacity monitor 226, the example user interface 228, the example map generator 230, the example relocation estimator 232, the example compass 234 and/or, more generally, the example mobile device 102 of FIG. 2 may be implemented by hardware, software, firmware and/or any combination of hardware, software and/or firmware. Thus, for example, any of the example GPS receiver 202, the example altimeter 206, the example radio receiver 208, the example radio transmitter 212, the example connectivity correlator 216, the example breadcrumb generator 218, the example data repository 220, the example collection manager 222, the example battery life monitor 224, the example storage capacity monitor 226, the example user interface 228, the example map generator 230, the example relocation estimator 232, the example compass 234 and/or, more generally, the example mobile device 102, could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example GPS receiver 202, the example altimeter 206, the example radio receiver 208, the example radio transmitter 212, the example connectivity correlator 216, the example breadcrumb generator 218, the example data repository 220, the example collection manager 222, the example battery life monitor 224, the example storage capacity monitor 226, the example user interface 228, the example map generator 230, the example relocation estimator 232, the example compass 234 and/or, more generally, the example mobile device 102 is/are hereby expressly defined to include a tangible computer readable storage device or storage disk such as a memory, a digital versatile disk (DVD), a compact disk (CD), a Blu-ray disk, etc. storing the software and/or firmware. Further still, the example mobile device 102 of FIG. 2 may include one or more elements, processes and/or devices in addition to, or instead of, those illustrated in FIG. 2, and/or may include more than one of any or all of the illustrated elements, processes and devices.

Flowcharts representative of example machine-readable instructions for implementing the example mobile device 102 of FIGS. 1-2 and 4-5 are shown in FIGS. 6-11. In these examples, the machine-readable instructions comprise one or more program(s) for execution by a processor such as the processor 1212 shown in the example processor platform 1200 discussed below in connection with FIG. 12. The one or more program(s) may be embodied in software stored on a tangible computer readable storage medium such as a CD-ROM, a floppy disk, a hard drive, a digital versatile disk (DVD), a Blu-ray disk, or a memory associated with the processor 1212, but the entire program(s) and/or parts thereof could alternatively be executed by a device other than the processor 1212 and/or embodied in firmware or dedicated hardware. Further, although the example program(s) is/are described with reference to the flowcharts illustrated in FIGS. 6-11, many other methods of implementing the example mobile device 102 may alternatively be used. For example, the order of execution of the blocks may be changed, and/or some of the blocks described may be changed, eliminated, or combined.

As mentioned above, the example processes of FIGS. 6-11 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-11 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 6:
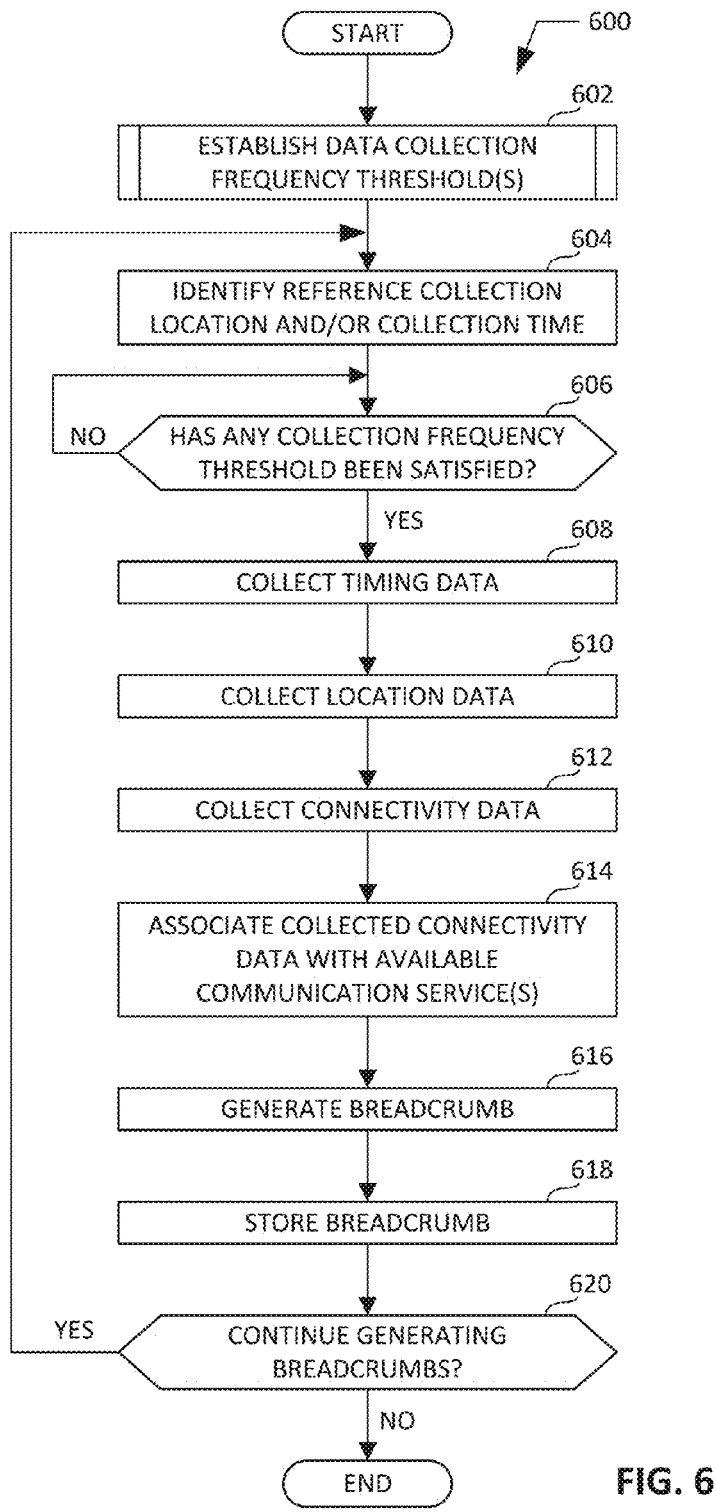
FIG. 6 is a flowchart representative of example machine-readable instructions that may be executed to implement the example mobile device of FIGS. 1-2 to generate and store pathway records.

FIG. 6 is a flowchart representative of example machine-readable instructions 600 that may be executed to implement the example mobile device 102 of FIGS. 1-2 to generate and store pathway records (e.g., the example pathway records 302, 304, 306, 308, 310, 312, 314, 316 of FIG. 3). The example program 600 of FIG. 6 begins when the example collection manager 222 establishes, determines and/or identifies one or more data collection frequency threshold(s) via which to control the collection of data and/or signals by the mobile device 102 (block 602). For example, the collection manager 222 establishes, determines and/or identifies one or more of the example timing threshold (e.g., a change in time of ten (10) minutes), the example location threshold (e.g., a change in location and/or distance of four-hundred (400) meters), the example remaining battery life threshold (e.g., a remaining battery life of less than twenty percent (20%)) and/or the remaining storage capacity threshold (e.g., a remaining storage capacity of less than ten percent (10%)) described above in connection with FIG. 2. An example process that may be used to implement block 602 is described in greater detail below in connection with FIG. 7. An additional and/or alternate example process that may be used to implement block 602 is described in greater detail below in connection with FIG. 8.

The example collection manager 222 identifies a reference location and/or a reference time associated with the mobile device 102 (block 604). For example, if the mobile device 102 has not yet initiated the collection of data in relation to the generation of pathway storage records, the collection manager 222 causes and/or instructs the example GPS receiver 202 and/or the example altimeter 206 to collect data and/or signals from which the reference location and/or reference time associated with the mobile device 102 can be identified and/or derived by the collection manager 222. If the mobile device 102 has instead previously collected data in relation to the generation of pathway storage records, the collection manager 222 identifies the reference location and/or reference time based on the location data and/or timing data associated with the most-recently generated pathway record.

The example collection manager 222 determines whether any collection frequency threshold has been satisfied relative to the identified reference location and/or the identified reference time (block 606). For example, the collection manager 222 may determine that the example timing threshold (e.g., a change in time of ten (10) minutes) or the example location threshold (e.g., a change in location and/or distance of four-hundred (400) meters) has been satisfied based on a change in time or location associated with the mobile device 102. If the collection manger 222 makes such a determination at block 606, control of the example program 600 proceeds to block 608. If the collection manager 222 instead determines at block 606 that no collection frequency threshold has been satisfied relative to the reference location and/or the reference time, control of the example program 600 remains at block 606 until the collection manager 222 determines that at least one collection frequency threshold has been satisfied relative to the reference location and/or reference time.

At block 608, the example collection manager 222 causes and/or instructs the example GPS receiver 202 to collect timing data (block 608). For example, the collection manager 222 may cause the GPS receiver 202 to collect data and/or signals at the example first location 120 of FIG. 1 from which the example timing data 320 will be identified and/or derived in connection with generating the example first pathway record 302 of FIG. 3. The example collection manager 222 also causes and/or instructs the example GPS receiver 202 and/or the example altimeter 206 to collect location data (block 610). For example, the collection manager 222 may cause the GPS receiver 202 and/or the altimeter 206 to collect data and/or signals at the example first location 120 of FIG. 1 from which the example location data 322 will be identified and/or derived in connection with generating the example first pathway record 302 of FIG. 3. The example collection manager 222 also causes and/or instructs the example radio receiver 208 to collect connectivity data (block 612). For example, the collection manager 222 may cause the radio receiver 208 to collect data and/or signals at the example first location 120 of FIG. 1 from which the example connectivity data 324 will be identified and/or derived in connection with generating the example first pathway record 302 of FIG. 3.

The example connectivity correlator 216 assigns, attributes and/or associates the collected connectivity data with one or more available communication service(s) (block 614). For example, the example connectivity correlator 216 determines the type(s) of available communication service(s) to assign, attribute and/or associate to and/or with the collected connectivity data based on a network parameter and/or a signal parameter identified and/or derived from the collected connectivity data, and further based on a correlation list, table and/or matrix. For example, based on the example network parameter 334 (e.g., the example network type of "LTE") and/or the example signal parameter 336 (e.g., the example signal strength of "−65 dBm") identified and/or derived from the data and/or signals collected at the example first location 120 of FIG. 1, and further based on the correlation list, table and/or matrix, the connectivity correlator 216 may determine that the example network parameter 334 and/or the example signal parameter 336 identified and/or derived from the data and/or signals collected at the example first location 120 of FIG. 1 correspond to example available communication services 338 that include text messaging, voice calling, network browsing and streaming media.

The example breadcrumb generator 218 generates a breadcrumb and/or pathway record based on the collected timing data, the collected location data and the available communication services data associated with the connectivity data (block 616). For example, based on the example timing data 320, the example location data 322 and the example available communication services data 338 identified and/or derived from the data and/or signals collected at the example first location 120 of FIG. 1, the breadcrumb generator 218 generates the example first pathway record 302 of FIG. 3.

The example data repository 220 stores the breadcrumb and/or pathway record generated by the example breadcrumb generator 218 (block 618). For example, the data repository 220 stores the example first pathway record 302 of FIG. 3 generated by the breadcrumb generator 218.

The example collection manager 222 determines whether the generation of breadcrumbs and/or pathway records should continue (block 620). For example, when no indication has been received via the example user interface 228 of the mobile device 102 instructing the collection manager 222 to cease the collection of data for the generation of breadcrumbs and/or pathway records, the collection manager 222 determines that breadcrumbs and/or pathway records should continue to be generated. If the collection manger 222 makes such a determination at block 620, control of the example program 600 returns to block 604 where the example location data 322 and/or the example timing data 320 associated with the most-recently generated pathway record (e.g., the example first pathway record 302 of FIG. 3) will thereafter be identified as the current reference location and/or the current reference time for purposes of determining whether any collection frequency threshold has been satisfied. If the collection manager 222 instead determines at block 620 that the generation of breadcrumbs should not continue, the example program 600 ends.

Figure 7:
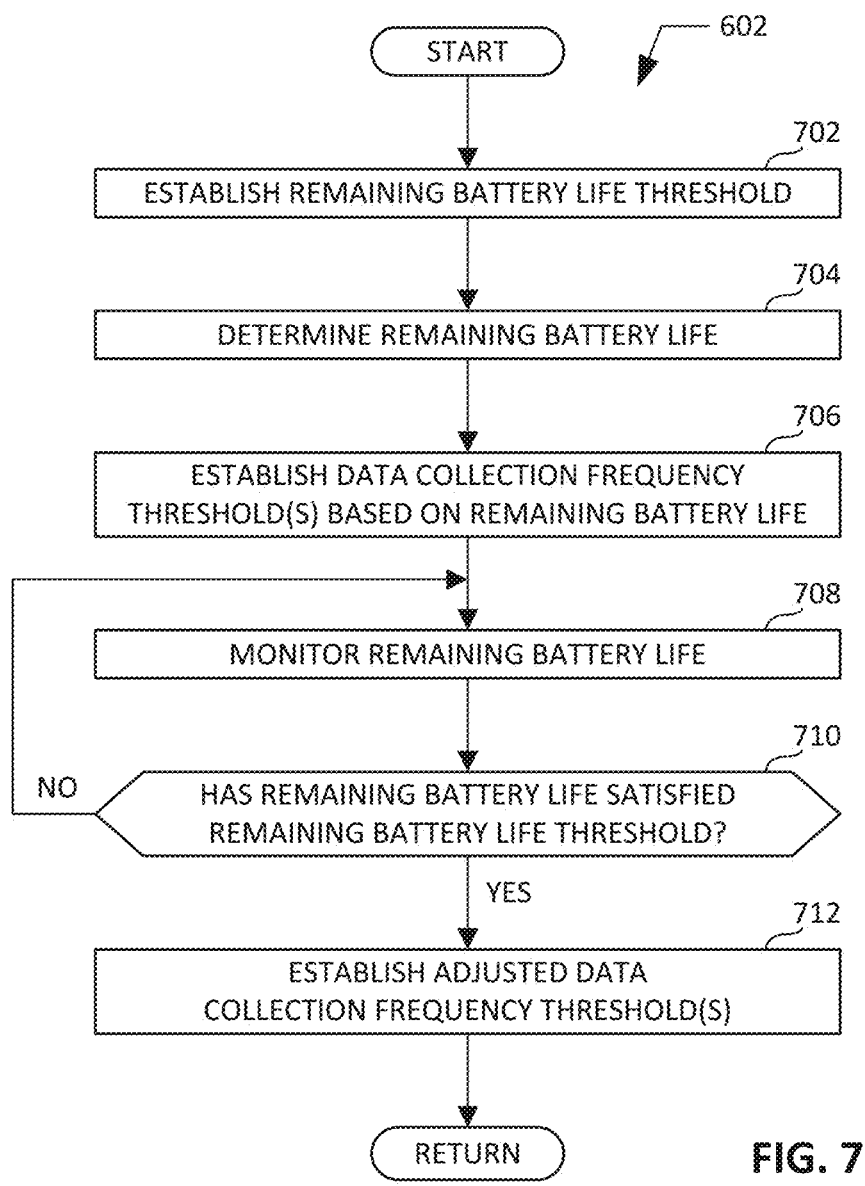
FIG. 7 is a flowchart representative of example machine-readable instructions that may be executed to implement the example mobile device of FIGS. 1-2 to establish a data collection frequency threshold that is based on the remaining battery life of the mobile device.

FIG. 7 is a flowchart representative of example machine-readable instructions 602 that may be executed to implement the example mobile device 102 of FIGS. 1-2 to establish a data collection frequency threshold that is based on the remaining battery life of the mobile device 102. Example operations of blocks 702, 704, 706, 708, 710 and 712 of FIG. 7 may be used to implement block 602 of FIG. 6.

The example program 602 of FIG. 7 begins when the example collection manager 222 establishes, determines and/or identifies a remaining battery life threshold via which to control the collection of data and/or signals by the mobile device 102 (block 702). For example, the collection manager 222 establishes, determines and/or identifies the example remaining battery life threshold (e.g., a remaining battery life of less than twenty percent (20%)) described above in connection with FIG. 2.

The example collection manager 222 determines and/or identifies the remaining battery life of the mobile device 102 (block 704). For example, the collection manager 222 causes and/or instructs the example battery life monitor 224 to sense and/or measure the remaining power and/or life associated with the battery of the mobile device 102 and to communicate a corresponding remaining battery life measurement and/or parameter to the collection manger 222.

The example collection manager 222 establishes, determines and/or identifies one or more data collection frequency threshold(s) based on the remaining battery life via which to control the collection of data and/or signals by the mobile device 102 (block 706). For example, if the identified remaining battery life associated with the mobile device 102 has not satisfied the example remaining battery life threshold (e.g., if the remaining battery life associated with the mobile device 102 is thirty percent (30%)), the collection manager 222 establishes, determines and/or identifies one or more of the example timing threshold (e.g., a change in time of ten (10) minutes) and/or the example location threshold (e.g., a change in location and/or distance of four-hundred (400) meters) described above in connection with FIG. 2.

The example battery life monitor 224 monitors the remaining battery life of the mobile device 102 (block 708). For example, the battery life monitor 224 senses and/or measures the remaining power and/or life associated with the battery of the mobile device 102 and periodically communicates a corresponding remaining battery life measurement and/or parameter to the collection manger 222.

The example collection manager 222 determines whether the remaining battery life of the mobile device 102 has satisfied the remaining battery life threshold (block 710). For example, the collection manager 222 may determine, based on a remaining battery life measurement and/or parameter communicated by the example battery life monitor 224, that the remaining battery life of the mobile device 102 has satisfied the example remaining battery life threshold (e.g., the remaining battery life associated with the mobile device 102 is eighteen percent (18%)). If the collection manger 222 makes such a determination at block 710, control of the example program 602 proceeds to block 712. If the collection manager 222 instead determines at block 710 that the remaining battery life of the mobile device 102 has not satisfied the remaining battery life threshold (e.g., the remaining battery life associated with the mobile device 102 is twenty-five percent (25%)), control of the example program 602 returns to block 708.

At block 712, the example collection manager 222 establishes, determines and/or identifies an adjusted data collection frequency threshold based on the remaining battery life via which to control the collection of data and/or signals by the mobile device 102 (block 712). For example, the collection manager 222 establishes, determines and/or identifies one or more of the example adjusted timing threshold (e.g., a change in time of twenty (20) minutes) and/or the example adjusted location threshold (e.g., a change in location and/or distance of eight-hundred (800) meters) described above in connection with FIG. 2. Following block 712, the example program 602 ends and control returns to a calling function or process such as the example program 600 of FIG. 6.

Figure 8:
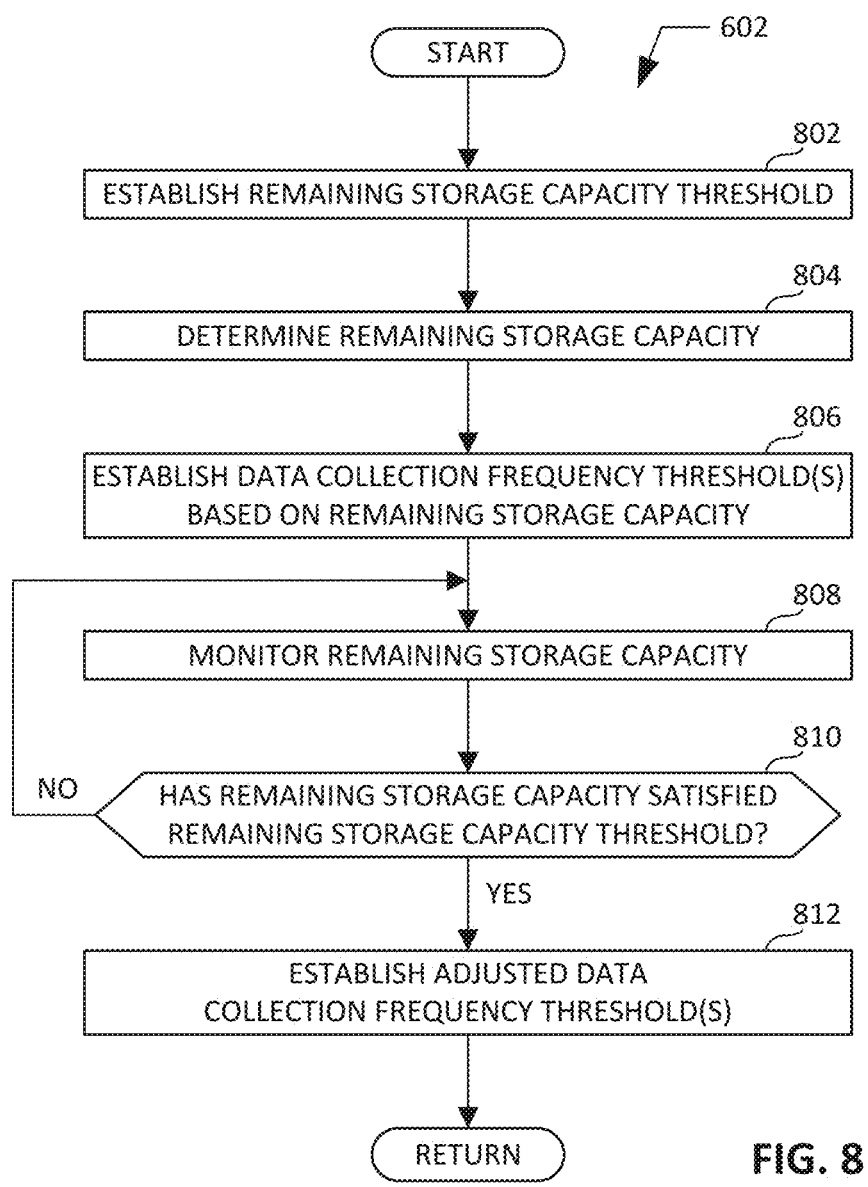
FIG. 8 is a flowchart representative of example machine-readable instructions that may be executed to implement the example mobile device of FIGS. 1-2 to establish a data collection frequency threshold that is based on the remaining storage capacity of the mobile device.

FIG. 8 is a flowchart representative of example machine-readable instructions 602 that may be executed to implement the example mobile device 102 of FIGS. 1-2 to establish a data collection frequency threshold that is based on the remaining storage capacity of the mobile device 102. Example operations of blocks 802, 804, 806, 808, 810 and 812 of FIG. 8 may be used to implement block 602 of FIG. 6. Example operations of blocks 802, 804, 806, 808, 810 and 812 of FIG. 8 may also be combined with example operations of blocks 702, 704, 706, 708, 710 and 712 of FIG. 7 described above to implement block 602 of FIG. 6.

The example program 602 of FIG. 8 begins when the example collection manager 222 establishes, determines and/or identifies a remaining storage capacity threshold via which to control the collection of data and/or signals by the mobile device 102 (block 802). For example, the collection manager 222 establishes, determines and/or identifies the example remaining storage capacity threshold (e.g., a remaining storage capacity of less than ten percent (10%)) described above in connection with FIG. 2.

The example collection manager 222 determines and/or identifies the remaining storage capacity of the mobile device 102 (block 804). For example, the collection manager 222 causes and/or instructs the example storage capacity monitor 226 to sense and/or measure the remaining storage capacity associated with the storage (e.g., the example data repository 220) of the mobile device 102 and to communicate a corresponding remaining storage capacity measurement and/or parameter to the collection manger 222.

The example collection manager 222 establishes, determines and/or identifies one or more data collection frequency threshold(s) based on the remaining storage capacity via which to control the collection of data and/or signals by the mobile device 102 (block 806). For example, if the identified remaining storage capacity associated with the mobile device 102 has not satisfied the example remaining storage capacity threshold (e.g., if the remaining storage capacity associated with the mobile device 102 is thirty percent (30%)), the collection manager 222 establishes, determines and/or identifies one or more of the example timing threshold (e.g., a change in time of ten (10) minutes) and/or the example location threshold (e.g., a change in location and/or distance of four-hundred (400) meters) described above in connection with FIG. 2.

The example storage capacity monitor 226 monitors the remaining storage capacity of the mobile device 102 (block 808). For example, the storage capacity monitor 226 senses and/or measures the remaining storage capacity associated with the storage (e.g., the example data repository 220) of the mobile device 102 and periodically communicates a corresponding remaining storage capacity measurement and/or parameter to the collection manger 222.

The example collection manager 222 determines whether the remaining storage capacity of the mobile device 102 has satisfied the remaining storage capacity threshold (block 810). For example, the collection manager 222 may determine, based on a remaining storage capacity measurement and/or parameter communicated by the example storage capacity monitor 226, that the remaining storage capacity of the mobile device 102 has satisfied the example remaining storage capacity threshold (e.g., the remaining storage capacity associated with the mobile device 102 is eight percent (8%)). If the collection manger 222 makes such a determination at block 810, control of the example program 602 proceeds to block 812. If the collection manager 222 instead determines at block 810 that the remaining storage capacity of the mobile device 102 has not satisfied the remaining storage capacity threshold (e.g., the remaining storage capacity associated with the mobile device 102 is fifteen percent (15%)), control of the example program 602 returns to block 808.

At block 812, the example collection manager 222 establishes, determines and/or identifies an adjusted data collection frequency threshold based on the remaining storage capacity via which to control the collection of data and/or signals by the mobile device 102 (block 812). For example, the collection manager 222 establishes, determines and/or identifies one or more of the example adjusted timing threshold (e.g., a change in time of twenty (20) minutes) and/or the example adjusted location threshold (e.g., a change in location and/or distance of eight-hundred (800) meters) described above in connection with FIG. 2. Following block 812, the example program 602 ends and control returns to a calling function or process such as the example program 600 of FIG. 6.

Figure 9:
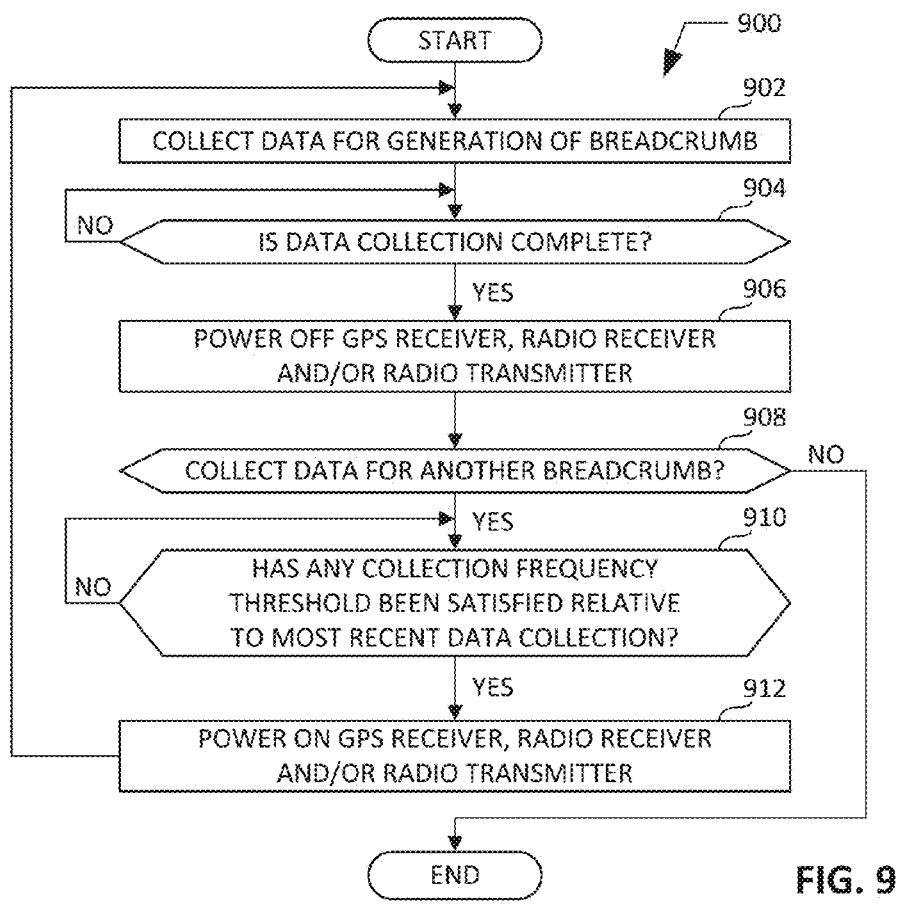
FIG. 9 is a flowchart representative of example machine-readable instructions that may be executed to implement the example mobile device of FIGS. 1-2 to conserve the remaining battery life of the mobile device in relation to the collection of data for the generation of pathway records.

FIG. 9 is a flowchart representative of example machine-readable instructions 900 that may be executed to implement the example mobile device 102 of FIGS. 1-2 to conserve the remaining battery life of the mobile device 102 in relation to the collection of data for the generation of pathway records (e.g., the example pathway records 302, 304, 306, 308, 310, 312, 314, 316 of FIG. 3). The example program 900 of FIG. 9 begins when the example collection manager 222 causes and/or instructs the example GPS receiver 202 and/or the example radio receiver 208 to collect data for the generation of a breadcrumb and/or pathway record (block 902). For example, the collection manager 222 may cause the GPS receiver 202 and/or the radio receiver 208 to collect data and/or signals at the example first location 120 of FIG. 1 from which the example timing data 320, the example location data 322 and the example connectivity data 324 will be identified and/or derived in connection with generating the example first pathway record 302 of FIG. 3.

The example collection manager 222 determines whether the collection of data for the generation of the breadcrumb and/or pathway record is complete (block 904). For example, the collection manager 222 may determine that the example breadcrumb generator 218 has generated the example first pathway record 302 of FIG. 3 corresponding to the data and/or signals collected by the GPS receiver 202 and/or the radio receiver 208 at the example first location 120 of FIG. 1, thus indicating that the collection of data in relation to the example first location 120 is complete. If the collection manger 222 makes such a determination at block 904, control of the example program 900 proceeds to block 906. If the collection manager 222 instead determines at block 904 that the collection of data is not complete, control of the example program 900 remains at block 904 until the collection manager 222 determines that the collection of data is complete.

At block 906, the example collection manager 222 powers off the example GPS receiver 202, the example radio receiver 208 and/or the example radio transmitter 212. For example, the collection manager 222 may cause and/or instruct the GPS receiver 202, the radio receiver 208 and/or the radio transmitter 212 to enter an inactive state in which the GPS receiver 202, the radio receiver 208 and/or the radio transmitter 212 are without sufficient power to collect and/or transmit data and/or signals.

The example collection manager 222 determines whether data should be collected for the generation of another breadcrumb and/or pathway record (block 908). For example, when no indication has been received via the example user interface 228 of the mobile device 102 instructing the collection manager 222 to cease the collection of data for the generation of breadcrumbs and/or pathway records, the collection manager 222 determines that data should be collected for the generation of another breadcrumb and/or pathway record. If the collection manger 222 makes such a determination at block 908, control of the example program 900 proceeds to block 910. If the collection manager 222 instead determines at block 908 that data should not be collected for the generation of another breadcrumb and/or pathway record, the example program 900 ends.

At block 910, the collection manager 222 determines whether any collection frequency threshold has been satisfied relative to the most recent collection of data and/or signals by the mobile device 102 (block 910). For example, the collection manager 222 may determine that the example timing threshold (e.g., a change in time of ten (10) minutes) or the example location threshold (e.g., a change in location and/or distance of four-hundred (400) meters) described above in connection with FIG. 2 has been satisfied based on a change in time or location associated with the mobile device 102 relative to the most recent collection of data and/or signals by the mobile device 102. If the collection manger 222 makes such a determination at block 910, control of the example program 900 proceeds to block 912. If the collection manager 222 instead determines at block 910 that no collection frequency threshold has been satisfied relative to the most recent collection of data and/or signals by the mobile device 102, control of the example program 900 remains at block 910 until the collection manager 222 determines that at least one collection frequency threshold has been satisfied relative to the most recent collection of data and/or signals by the mobile device 102.

At block 912, the example collection manager 222 powers on any of the example GPS receiver 202, the example radio receiver 208 and/or the example radio transmitter 212 that may have been powered off in connection with block 906. For example, the collection manager 222 may cause and/or instruct the GPS receiver 202, the radio receiver 208 and/or the radio transmitter 212 to enter an active state in which the GPS receiver 202, the radio receiver 208 and/or the radio transmitter 212 are sufficiently powered to collect and/or transmit data and/or signals. Following block 912, control of the example program 900 returns to block 902.

The example program 900 will continue to execute until the collection manager 222 has determined at block 908 that data should not be collected for the generation of another breadcrumb and/or pathway record. Following such a determination by the collection manager 222, the example program 900 ends.

Figure 10:
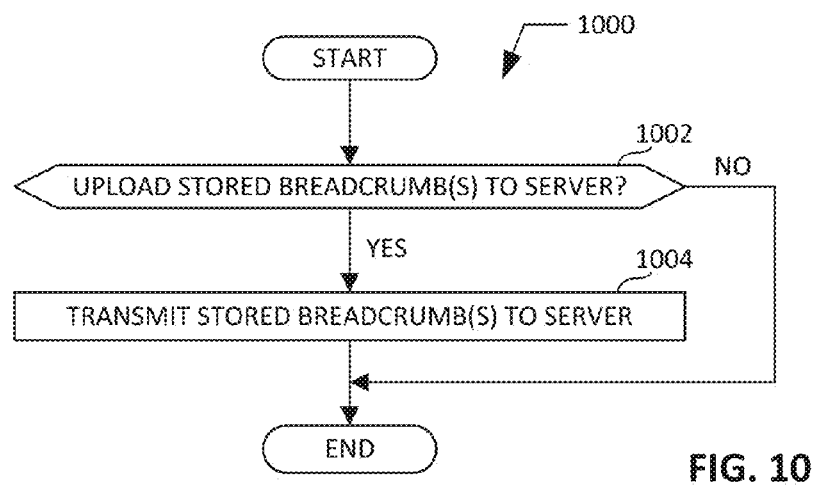
FIG. 10 is a flowchart representative of example machine-readable instructions that may be executed to implement the example mobile device of FIGS. 1-2 to upload pathway records generated and stored by the mobile device to a server.

FIG. 10 is a flowchart representative of example machine-readable instructions 1000 that may be executed to implement the example mobile device 102 of FIGS. 1-2 to upload pathway records (e.g., the example pathway records 302, 304, 306, 308, 310, 312, 314, 316 of FIG. 3) generated and stored by the mobile device 102 to a server. The example program 1000 of FIG. 10 begins when the mobile device 102 determines whether one or more breadcrumb(s) and/or pathway record(s) stored in the example data repository 220 should be uploaded to a server (block 1002). For example, the mobile device 102 may receive a notification, instruction and/or command via the example user interface 228 indicating to the mobile device 102 that the example pathway records 302, 304, 306, 308, 310, 312, 314, 316 of FIG. 3 should be uploaded from the example data repository 220 of the mobile device 102 to a server. If the mobile device 102 makes such a determination at block 1002, control of the example program 1000 proceeds to block 1004. If the mobile device 102 instead determines at block 1002 that no breadcrumb(s) and/or pathway record(s) stored in the example data repository 220 should be uploaded to a server, the example program 1000 ends.

At block 1004, the mobile device 102 causes and/or instructs the example radio transmitter 212 to transmit the one or more stored breadcrumb(s) and/or pathway record(s) to the server. For example, the mobile device 102 may cause the transmitter 212 to transmit the example pathway records 302, 304, 306, 308, 310, 312, 314, 316 of FIG. 3 from the mobile device 102 to a server. Following block 1004, the example program 1000 ends.

Figure 11:
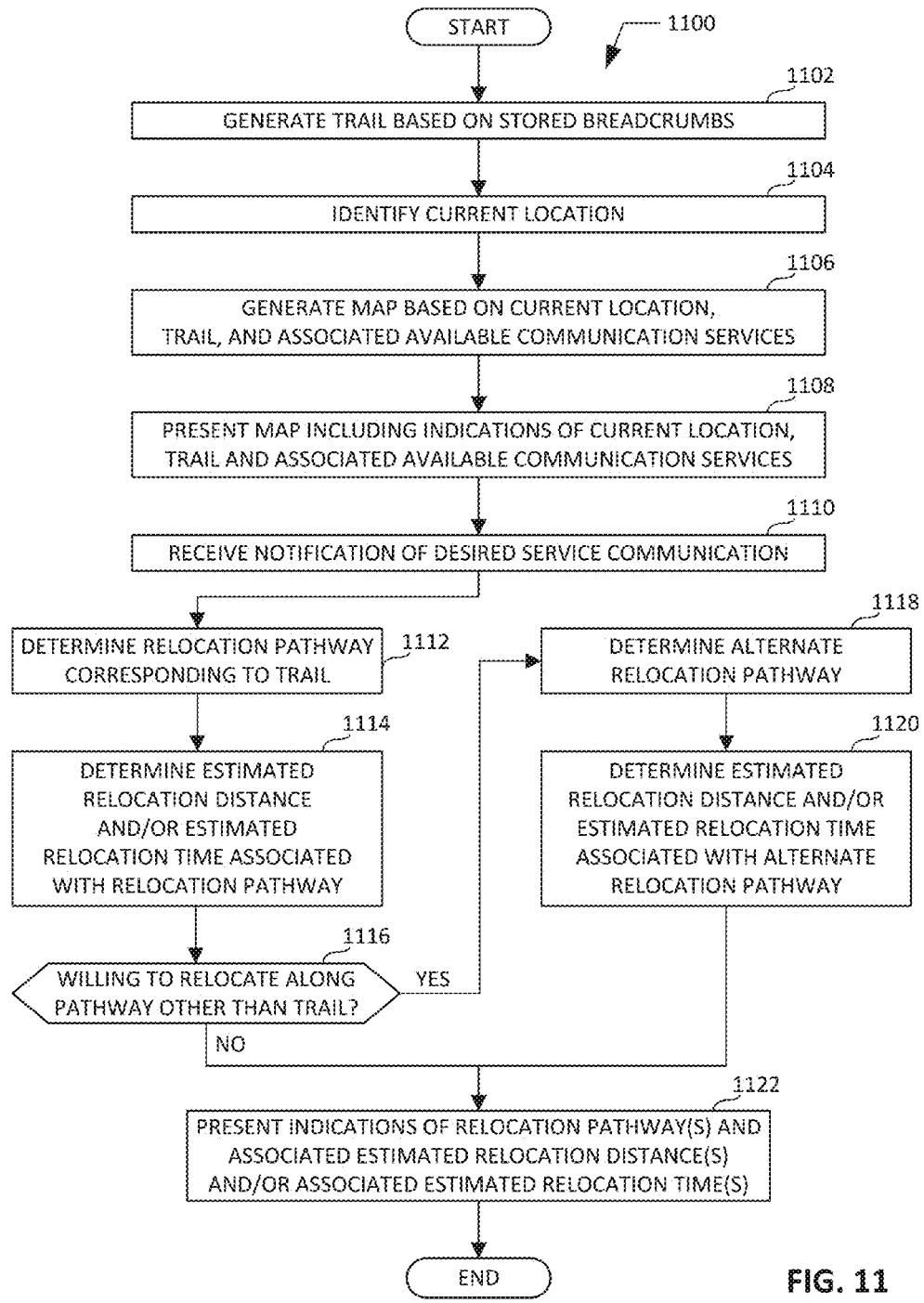
FIG. 11 is a flowchart representative of example machine-readable instructions that may be executed to implement the example mobile device of FIGS. 1-2 and 4-5 to provide an estimated relocation distance and/or an estimated relocation time associated with relocating the mobile device from a current location to a collection location associated with a pathway record having an available communication service that supports a desired communication service.

FIG. 11 is a flowchart representative of example machine-readable instructions 1100 that may be executed to implement the example mobile device 102 of FIGS. 1-2 and 4-5 to provide an estimated relocation distance and/or an estimated relocation time associated with relocating the mobile device 102 from a current location to a collection location associated with a pathway record having an available communication service that supports a desired communication service. The example program 1100 of FIG. 11 begins when the example map generator 230 generates a trail based on a time-ordered sequence of breadcrumbs and/or pathway records stored by the mobile device 102 (block 1102). For example, the map generator 230 generates the example trail 404 of FIG. 4 based on a time-ordered sequence of the example breadcrumbs and/or pathway records 302, 304, 306, 308, 310, 312, 314, 316 of FIG. 3 generated by the example breadcrumb generator 218 and stored by the example data repository 220 of FIG. 2. The example trail 404 generated by the map generator 230 begins at the example first pathway record 302 and ends at the example eighth pathway record 316.

The example collection manager 222 determines and/or identifies the current location of the example mobile device 102 (block 1104). For example, the collection manager 222 causes and/or instructs the example GPS receiver 202 and/or the example altimeter 206 to collect data and/or signals from which the example current location 406 of FIG. 4 associated with the mobile device 102 can be identified and/or derived by the collection manager 222.

The example map generator 230 generates a map based on the current location of the mobile device 102, the trail, and the connectivity data associated with the stored breadcrumbs and/or pathway records (block 1106). For example, the map generator 230 generates the example map 402 of FIG. 4 based on the example current location 406 of the mobile device 102, the example trail 404, and the example available communication services 338 associated with respective ones of the example breadcrumbs and/or pathway records 302, 304, 306, 308, 310, 312, 314, 316 of FIG. 3.

The example user interface 228 presents and/or displays a map including indications of the current location of the mobile device 102, the trail, and the available communication services associated with the stored breadcrumbs and/or pathway records (block 1108). For example, the user interface 228 presents the example map 402 of FIG. 4 including indications of the example current location 406 of the mobile device 102, the example trail 404, and the example icons 410, 412, 414, 416 indicative of the available communication services) associated with respective ones of the example breadcrumbs and/or pathway records 302, 304, 306, 308, 310, 312, 314, 316 of FIG. 3.

The mobile device 102 receives a notification via the example user interface 228 indicative of a desired communication service for the mobile device 102 (block 1110). For example, the mobile device 102 receives a notification via the example user interface 228 indicative of the example desired communication service 506 of FIG. 5 corresponding to a network browsing communication service.

Based on the identified desired communication service, the example relocation estimator 232 determines and/or identifies a relocation pathway that follows, tracks and/or corresponds to the trail (block 1112). For example, the relocation estimator 232 determines that the collection location corresponding to the example fourth pathway record 308 is the most proximate location along the example trail 404 relative to the example current location 406 of the mobile device 102 that may be able to support the example desired communication service 506 of FIG. 5 for the mobile device 102. Based on this determination, the relocation estimator 232 determines and/or identifies the example first relocation pathway 502 of FIG. 5 that follows along, tracks along and/or corresponds to the example trail 404, beginning at the example current location 406 and ending at the collection location associated with the example fourth pathway record 308.

The example relocation estimator 232 determines and/or identifies an estimated relocation distance and/or an estimated relocation time associated with relocating the mobile device 102 along the identified relocation pathway (block 1114). For example, the relocation estimator 232 determines and/or identifies the example first estimated relocation distance 508 (e.g., sixteen-hundred (1600) meters) and/or the example first estimated relocation time 510 (e.g., forty (40) minutes) associated with relocating the mobile device 102 along the example first relocation pathway 502 of FIG. 5.

The example relocation estimator 232 determines whether the end user of the mobile device 102 is willing to relocate the mobile device 102 along a pathway other than a pathway that follows along, tracks along and/or corresponds to the trail (block 1116). For example, the relocation estimator 232 may determine that the end user of the mobile device 102 is willing to relocate the mobile device 102 along a pathway that does not follow along, track along and/or correspond to the trail. If the relocation estimator 232 makes such a determination at block 1116, control of the example program 1100 proceeds to block 1118. If the relocation estimator 232 instead determines at block 1116 that the end user of the mobile device 102 is not willing to relocate the mobile device 102 along a pathway other than a pathway that follows along, tracks along and/or corresponds to the trail, control of the example program 1100 proceeds to block 1122.

Based on the identified desired communication service, the example relocation estimator 232 determines and/or identifies an alternate relocation pathway (block 1118). For example, the relocation estimator 232 determines that the collection location corresponding to the example fourth pathway record 308 is the most proximate location relative to the example current location 406 of the mobile device 102 that may be able to support the example desired communication service 506 of FIG. 5 for the mobile device 102. Based on this determination, the relocation estimator 232 determines and/or identifies the example second relocation pathway 504 of FIG. 5, the example second relocation pathway 504 being indicative of the shortest available pathway from the example current location 406 to the collection location associated with the example fourth pathway record 308.

The example relocation estimator 232 determines and/or identifies an estimated relocation distance and/or an estimated relocation time associated with relocating the mobile device 102 along the identified alternate relocation pathway (block 1120). For example, the relocation estimator 232 determines and/or identifies the example second estimated relocation distance 512 (e.g., four-hundred (400) meters) and/or the example second estimated relocation time 514 (e.g., ten (10) minutes) associated with relocating the mobile device 102 along the example second relocation pathway 504 of FIG. 5.

At block 1122, the example user interface 228 presents and/or displays indications of the relocation pathway(s) and the associated estimated relocation distance(s) and/or estimated relocation time(s) (block 1122). For example, the example user interface 228 presents indications of the example first relocation pathway 502, the example first estimated relocation distance 508, the example first estimated relocation time 510, the example second relocation pathway 504, the example second estimated relocation distance 512 and the example second estimated relocation time 514 of FIG. 5. Following block 1122, the example program 1100 ends.

Figure 12:
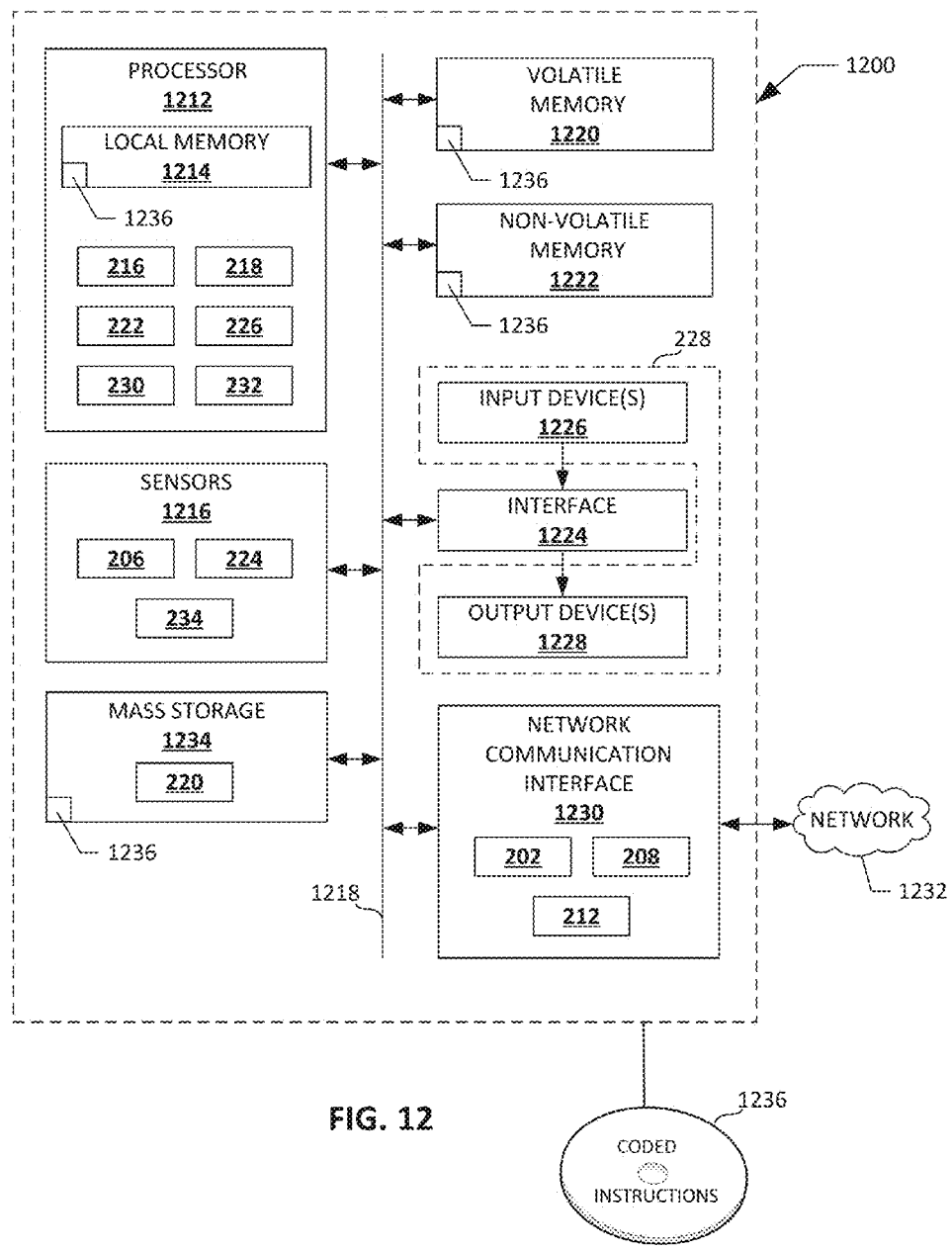
FIG. 12 is an example processor platform capable of executing the example instructions of FIGS. 6-11 to implement the example mobile device of FIGS. 1-2 and 4-5.

FIG. 12 is a block diagram of an example processor platform 1200 capable of executing the example instructions of FIGS. 6-11 to implement the example mobile device 102 of FIGS. 1-2 and 4-5. The processor platform 1200 can be, for example, a personal computer, a tablet, a smartphone, or any other type of mobile computing device, including for example, the example mobile device 102.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The example processor 1212 includes a local memory 1214 (e.g., a cache). The example processor 1212 also includes the example connectivity correlator 216, the example breadcrumb generator 218, the example collection manager 222, the example storage capacity monitor 226, the example map generator 230 and the example relocation estimator 232 of FIG. 2.

The processor 1212 of the illustrated example is in communication with one or more example sensors 1216 via a bus 1218. The example sensors 1216 include the example altimeter 206, the example battery life monitor 224 and the example compass 234 of FIG. 2.

The processor 1212 of the illustrated example is in communication with a main memory including a volatile memory 1220 and a non-volatile memory 1222 via the bus 1218. The volatile memory 1220 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1222 may be implemented by flash memory and/or any other desired type of memory device. Access to the main memory 1220, 1222 is controlled by a memory controller.

The processor platform 1200 of the illustrated example also includes an interface circuit 1224. The interface circuit 1224 may be implemented by any type of interface standard, such as an Ethernet interface, a universal serial bus (USB), and/or a PCI express interface. In the illustrated example, one or more input devices 1226 are connected to the interface circuit 1224. The input device(s) 1226 permit(s) a user to enter data and commands into the processor 1212. The input device(s) can be implemented by, for example, a keyboard, a mouse, a touchscreen, a track-pad, a trackball, isopoint and/or a voice recognition system. One or more output devices 1228 are also connected to the interface circuit 1224 of the illustrated example. The output devices 1228 can be implemented, for example, by display devices (e.g., a liquid crystal display, a cathode ray tube display (CRT), a touchscreen and/or speakers). The interface circuit 1224 of the illustrated example, thus, typically includes a graphics driver card, a graphics driver chip or a graphics driver processor. In the illustrated example, the input device(s) 1226 and the output device(s) 1228 collectively form the example user interface 228 of FIG. 2.

The processor platform 1200 of the illustrated example also includes a network communication interface circuit 1230. The network communication interface circuit 1230 may be implemented by any type of interface standard, such as an Ethernet interface, a universal serial bus (USB), and/or a PCI express interface. In the illustrated example, the network interface circuit 1230 includes the example GPS receiver 202, the example radio receiver 208 and the example radio transmitter 212 of FIG. 2 to facilitate the exchange of data and/or signals with external machines (e.g., cellular base stations, a wireless access points, computing devices of any kind, etc.) via a network 1232 (e.g., a cellular network, a wireless local area network (WLAN), a GPS network, an Ethernet connection, a digital subscriber line (DSL), a telephone line, coaxial cable, etc.).

The processor platform 1200 of the illustrated example also includes one or more mass storage devices 1234 for storing software and/or data. Examples of such mass storage devices 1234 include floppy disk drives, hard drive disks, compact disk drives, Blu-ray disk drives, RAID systems, and digital versatile disk (DVD) drives. In the illustrated example, the mass storage device 1234 includes the example data repository 220 of FIG. 2.

Coded instructions 1236 implementing the machine-readable instructions of FIGS. 6-11 may be stored in the local memory 1214, in the volatile memory 1220, in the non-volatile memory 1222, in the mass storage device 1234, and/or on a removable tangible computer readable storage medium such as a CD or DVD.

From the foregoing, it will be appreciated that the disclosed methods and apparatus advantageously provide an end user of a mobile device, even when the mobile device is located in an area where cellular and/or Wi-Fi® connectivity are unavailable, with the ability to identify a location at which a desired communication service will be available to the mobile device. The disclosed methods and apparatus may advantageously direct the end user of the mobile device to the desired communication service location along a trail that has recently been traveled and/or navigated by the end user, thereby providing the end user with a relocation pathway with which the end user is certain to be familiar.

From the foregoing, it will also be appreciated that the aforementioned advantages may be provided in conjunction with one or more data collection processes disclosed herein that facilitate the preservation and/or conservation of critical resources of the mobile device such as, for example, remaining battery life and/or remaining storage capacity. The preservation and/or conservation of such critical resources may be of particular importance in rural wilderness areas where cellular and/or Wi-Fi® connectivity may be sparse.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   generating, by a mobile device, pathway records based on data collected at a collection frequency via the mobile device, respective ones of the pathway records including timing data indicative of a collection time, location data indicative of a collection location of the mobile device at the collection time, and data indicative of available communication services for the mobile device at the collection location, the available communication services being determined based on a signal strength parameter and a network type parameter associated with one or more signals received by the mobile device at the collection location, the collection frequency being based on a threshold change in time for the mobile device relative to the collection time of a most-recently generated one of the pathway records; and
   presenting, via a user interface of the mobile device, a map including indications of a current location of the mobile device, a trail representing a time-ordered sequence of the pathway records based on the timing data associated with respective ones of the pathway records, and the available communication services associated with respective ones of the pathway records.

2. The method of claim 1, further including, in response to receiving a notification via the user interface indicative of a desired communication service for the mobile device, presenting an indication of at least one of an estimated relocation distance or an estimated relocation time associated with relocating the mobile device from the current location to the collection location associated with a respective one of the pathway records having an available communication service that supports the desired communication service.

3. The method of claim 2, wherein the at least one of the estimated relocation distance or the estimated relocation time is further associated with relocating the mobile device along a pathway corresponding to the trail.

4. The method of claim 1, wherein the available communication services include at least one of a text messaging service, a voice calling service, a network browsing service, or a streaming media service.

5. The method of claim 2, wherein the desired communication service is at least one of a text messaging service, a voice calling service, a network browsing service, or a streaming media service.

6. The method of claim 1, wherein the collection frequency is further based on a threshold change in location of the mobile device relative to the collection location of a most-recently generated one of the pathway records.

7. The method of claim 1, wherein the collection frequency is configurable via the user interface.

8. The method of claim 1, wherein the collection frequency decreases in response to a decrease in a remaining battery life parameter of the mobile device.

9. The method of claim 1, wherein the collection frequency decreases in response to a decrease in a remaining storage capacity parameter of the mobile device.

10. The method of claim 1, further including powering off at least one of a GPS receiver, a radio receiver, or a radio transmitter of the mobile device during a period of time at which data is not being collected for generation of the pathway records.

11. The method of claim 1, further including uploading the pathway records to a server for inclusion in a pathway record database.

12. A mobile device comprising:
a memory including machine readable instructions; and
a processor to execute the machine readable instructions to:
invoke a breadcrumb generator to generate pathway records based on data collected at a collection frequency via the mobile device, respective ones of the pathway records including (a) timing data indicative of a collection time, (b) location data indicative of a collection location of the mobile device at the collection time, and (c) data indicative of available communication services for the mobile device at the collection location, the available communication services being determined based on a signal strength parameter and a network type parameter associated with one or more signals received by the mobile device at the collection location, the collection frequency being based on a threshold change in time for the mobile device relative to the collection time of a most-recently generated one of the pathway records; and
invoke a user interface to present a map including indications of (a) a current location of the mobile device, (b) a trail representing a time-ordered sequence of the pathway records based on the timing data associated with respective ones of the pathway records, and (c) the available communication services associated with respective ones of the pathway records.

13. The mobile device of claim 12, wherein the processor is further to execute the machine readable instructions to invoke the user interface to, in response to receiving a notification indicative of a desired communication service for the mobile device, present an indication of at least one of an estimated relocation distance or an estimated relocation time associated with relocating the mobile device from the current location to the collection location associated with a respective one of the pathway records having an available communication service that supports the desired communication service.

14. The mobile device of claim 13, wherein the at least one of the estimated relocation distance or the estimated relocation time is further associated with relocating the mobile device along a pathway corresponding to the trail.

15. A tangible machine-readable storage medium comprising instructions that, when executed, cause a machine to perform operations comprising:
generating pathway records based on data collected at a collection frequency via a mobile device, respective ones of the pathway records including (a) timing data indicative of a collection time, (b) location data indicative of a collection location of the mobile device at the collection time, and (c) data indicative of available communication services for the mobile device at the collection location, the available communication services being determined based on a signal strength parameter and a network type parameter associated with one or more signals received by the mobile device at the collection location, the collection frequency being based on a threshold change in time for the mobile device relative to the collection time of a most-recently generated one of the pathway records; and
presenting, via a user interface of the mobile device, a map including indications of (a) a current location of the mobile device, (b) a trail representing a time-ordered sequence of the pathway records based on the timing data associated with respective ones of the pathway records, and (c) the available communication services associated with respective ones of the pathway records.

16. The tangible machine-readable storage medium of claim 15, wherein the operations further comprise, in response to receiving a notification via the user interface indicative of a desired communication service for the mobile device, presenting an indication of at least one of an estimated relocation distance or an estimated relocation time associated with relocating the mobile device from the current location to the collection location associated with a respective one of the pathway records having an available communication service that supports the desired communication service.

17. The tangible machine-readable storage medium of claim 16, wherein the at least one of the estimated relocation distance or the estimated relocation time is further associated with relocating the mobile device along a pathway corresponding to the trail.

18. The tangible machine-readable storage medium of claim 15, wherein the operations further comprise powering off at least one of a GPS receiver, a radio receiver, or a radio transmitter of the mobile device during a period of time at which data is not being collected for generation of the pathway records.

* * * * *